US008089340B2

(12) United States Patent
Cochran et al.

(10) Patent No.: US 8,089,340 B2
(45) Date of Patent: Jan. 3, 2012

(54) REAL-TIME SCREENING INTERFACE FOR A VEHICLE SCREENING SYSTEM

(75) Inventors: Edward L. Cochran, Minneapolis, MN (US); Jeffrey M. Rye, Minneapolis, MN (US); Bruce W. Anderson, Andover, MN (US); Thomas R. Markham, Fridley, MN (US)

(73) Assignee: Honeywell International Inc., Morristown, NJ (US)

( * ) Notice: Subject to any disclaimer, the term of this patent is extended or adjusted under 35 U.S.C. 154(b) by 1190 days.

(21) Appl. No.: 11/650,720

(22) Filed: Jan. 5, 2007

(65) Prior Publication Data

US 2008/0164974 A1 Jul. 10, 2008

(51) Int. Cl.

| | |
|---|---|
| ***B60R 25/00*** | (2006.01) |
| ***G06T 1/00*** | (2006.01) |
| ***G06K 9/00*** | (2006.01) |
| ***H04Q 5/22*** | (2006.01) |

(52) U.S. Cl. ...... 340/5.7; 340/5.82; 340/5.83; 340/5.81; 340/10.1; 382/115; 382/118

(58) Field of Classification Search ........................ None
See application file for complete search history.

(56) References Cited

U.S. PATENT DOCUMENTS

| | | | | |
|---|---|---|---|---|
| 6,072,894 | A | 6/2000 | Payne | 382/118 |
| 6,119,096 | A | 9/2000 | Mann et al. | 705/5 |
| 6,225,906 | B1 * | 5/2001 | Shore | 340/573.4 |
| 6,958,676 | B1 | 10/2005 | Morgan et al. | |
| 6,972,693 | B2 | 12/2005 | Brown et al. | 340/907 |
| 6,999,606 | B1 | 2/2006 | Frischholz | 382/118 |
| 7,180,050 | B2 * | 2/2007 | Imagawa et al. | 250/221 |
| 7,362,219 | B2 * | 4/2008 | Nogami et al. | 340/505 |
| 7,439,847 | B2 * | 10/2008 | Pederson | 340/5.81 |
| 7,532,743 | B2 * | 5/2009 | Morisada | 382/103 |
| 7,552,868 | B1 * | 6/2009 | Block et al. | 235/379 |
| 2002/0128770 | A1 * | 9/2002 | Ooishi | 701/207 |
| 2003/0004792 | A1 * | 1/2003 | Townzen et al. | 705/13 |
| 2003/0225767 | A1 | 12/2003 | Archibald et al. | 707/10 |
| 2004/0151347 | A1 | 8/2004 | Wisniewski | 382/115 |

(Continued)

FOREIGN PATENT DOCUMENTS

| | | |
|---|---|---|
| WO | WO 2004/061771 A1 | 7/2004 |
| WO | WO 2006/041416 A1 | 4/2006 |
| WO | WO 2006/052683 A1 | 5/2006 |

OTHER PUBLICATIONS

Integrated AUVIS, Gatekeeper Security.

(Continued)

*Primary Examiner* — Jennifer Mehmood
*Assistant Examiner* — Fekadeselassie Girma
(74) *Attorney, Agent, or Firm* — Luis M. Ortiz; Kermit D. Lopez; Melissa L. Asfahani

(57) ABSTRACT

A vehicle screening system for screening vehicles and occupants for entrance to a secured facility is disclosed. The system can include a processor and an interface that communicates with the processor, wherein the interface displays identification information extracted from a vehicle occupant associated with a vehicle for processing by the processor. Additionally, a plurality of controls are associated with the interface and the processor, wherein the plurality of controls facilitates the handling and management of the information extracted from the vehicle occupant to either permit or deny the vehicle occupant and the vehicle entry to a secured facility through a security gate.

20 Claims, 29 Drawing Sheets

U.S. PATENT DOCUMENTS

| | | | | |
|---|---|---|---|---|
| 2005/0063569 | A1 | 3/2005 | Colbert et al. | 382/118 |
| 2006/0082438 | A1 | 4/2006 | Bazakos et al. | 340/5.82 |
| 2006/0082439 | A1 * | 4/2006 | Bazakos et al. | 340/5.82 |
| 2006/0089754 | A1 | 4/2006 | Mortenson | 701/1 |
| 2006/0261931 | A1 * | 11/2006 | Cheng | 340/426.1 |
| 2007/0057815 | A1 * | 3/2007 | Foy et al. | 340/905 |
| 2007/0150336 | A1 * | 6/2007 | Boily | 705/13 |

OTHER PUBLICATIONS

PCT—Notification of Transmittal of the International Search Report and the Written Opinion of the International Searching Authority, or the Declaration, Date of Mailing: Jun. 11, 2008.

* cited by examiner

REAL-TIME SCREENING INTERFACE FOR A VEHICLE SCREENING SYSTEM

TECHNICAL FIELD

Embodiments are generally related to data-processing devices and techniques. Embodiments are also related to vehicle screening systems and methods. Embodiments are additionally related to biometric identification techniques. Embodiments are also related to GUI (Graphical User Interface) systems and methods.

BACKGROUND

The expansion of terrorism throughout the world has resulted in increased hazards to many cultures, particularly relatively free and open societies such as the United States of America. In such an open society, it is relatively easy to do a great deal of damage, as evidenced by "car bombs," i.e., automobiles or other vehicles loaded with explosives and detonated beneath or near a building structure.

Such motor vehicles are also used for concealing and smuggling various types of weaponry and contraband (drugs, etc.). Authorities are well aware of the potential hazards of such concealed articles and materials, and a number of automated inspection devices employing different principles of operation have been developed in response. Nevertheless, the inspection of every vehicle passing a given point or location is generally impractical in most instances. This is particularly true for large scale events, e.g. major sporting events, public events at military bases, facilities providing daily employment to large numbers of workers and staff, etc.

Presently, inspection devices employing one principle of operation are utilized for detecting explosives, and another principle or principles is/are used for the detection of concealed weapons. These various detection devices are independent of one another and must be used separately in any given inspection station or location. In many instances, authorities simply cannot provide the number of personnel required to perform all of the inspections necessary to completely inspect all vehicles passing through a given checkpoint. Even if it were possible to provide sufficient personnel, this would clearly add considerably to the time involved in a detailed inspection of every vehicle passing through a given inspection point.

It is therefore believed that one solution to these problems involves the design and implementation of a self-screening system for permitting vehicles to pass through security gates in order to gain access to a facility or area.

BRIEF SUMMARY

The following summary is provided to facilitate an understanding of some of the innovative features unique to the embodiments and is not intended to be a full description. A full appreciation of the various aspects of the embodiments disclosed can be gained by taking the entire specification, claims, drawings, and abstract as a whole.

It is, therefore, one aspect of the present invention to provide for improved data-processing techniques and devices.

It is another aspect of the present invention to provide for a real-time screening interface for a vehicle screening system.

It is a further aspect of the present invention to provide for a user interface for secondary screening in a vehicle screening system.

It is also an aspect of the present invention to provide for a user interface for an electronic kiosk used in a vehicle screening system.

It is yet another aspect of the present invention to provide for a vehicle gate management system.

The aforementioned aspects of the invention and other objectives and advantages can now be achieved as described herein.

In accordance with one embodiment, a vehicle screening system for screening vehicles and occupants for entrance to a secured facility is disclosed. In general, such a system includes a processor and an interface that communicates with the processor, wherein the interface displays identification information extracted from a vehicle occupant associated with a vehicle for processing by the processor. Additionally, a plurality of controls are associated with the interface and the processor, wherein the plurality of controls permit facilitates the handling and management of the information extracted from the vehicle occupant in order to permit or deny the vehicle occupant and the vehicle entry to a secured facility through a security gate.

The interface can display information about the vehicle occupant electronically extracted from a database in response to a query to the database initiated through the interface. The information about the vehicle occupant extracted from the database further includes any available adverse information concerning the vehicle occupant.

In accordance with another embodiment, the interface can further include a car list screen for displaying information within the interface regarding a plurality of vehicles in line with respect to security gate, wherein the car list screen permits a selection of a vehicle by a secondary screener from among the plurality of vehicles for greater information granularity with respect to the selected vehicle. The interface also includes a car information screen that displays information within the interface concerning the selected vehicle and which permits the secondary vehicle information to add and modify information concerning the selected vehicle In accordance with another embodiment, a user interface apparatus can be provided for use in a drive-up electronic kiosk in a vehicle screening system. The user interface generally includes a processor, and a drive-up electronic kiosk that communicates with the processor. An interface is associated with the processor and the drive-up electronic kiosk, wherein the interface instructs and permits a vehicle occupant to rapidly input identification data to the drive-up electronic kiosk and thereafter verifies or denies the vehicle occupant entry to a secured facility through a security gate.

In accordance with an additional embodiment, a security gate management system can be provided, which includes a plurality of sensors for detecting an identity of a vehicle and/or a vehicle occupant with respect to a security gate for entry to a secured facility, wherein the plurality of sensors are located proximate to the security gate for optimal screening and identification of the vehicle occupant and/or the vehicle. Such a system can also includes a database for storing and retrieving security and business information, and an interface console for permitting a security guard to electronically and remotely monitor the vehicle and/or the vehicle occupant utilizing data retrieved from the plurality of sensors and security and business data information retrieved from the database, thereby permitting the security guard to rapidly and efficiently verify or deny the vehicle occupant and/or the vehicle entry to the secured facility through the security gate.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the principles of the disclosed embodiments.

DETAILED DESCRIPTION

The particular values and configurations discussed in these non-limiting examples can be varied and are cited merely to illustrate at least one embodiment and are not intended to limit the scope of the invention.

Figure 1:
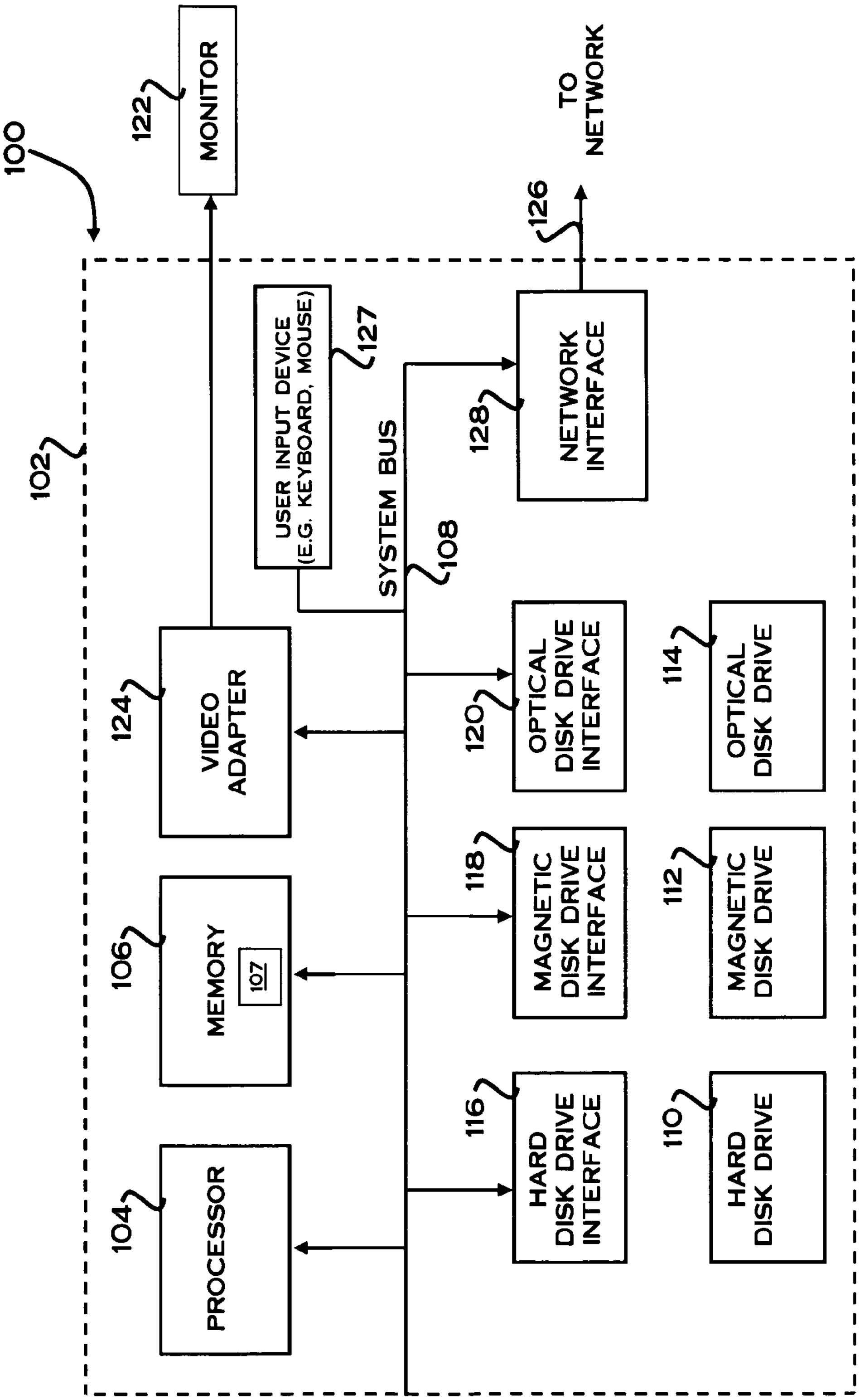
FIG. 1 illustrates a block diagram of a data-processing apparatus, which can be adapted for use in implementing a preferred embodiment.

FIG. 1 illustrates a block diagram of a data-processing apparatus 100, which can be utilized in accordance with a preferred embodiment. Data-processing apparatus 100 (e.g., a computer) can be utilized in the context of the vehicle screening system 200 disclosed in further detail here. Data-processing apparatus 100 can be configured to include a general purpose computing device, such as a computer 102. The computer 102 includes a processing unit 104, a memory 106, and a system bus 108 that operatively couples the various system components to the processing unit 104. One or more processing units 104 operate as either a single central processing unit (CPU) or a parallel processing environment.

The data-processing apparatus 100 further includes one or more data storage devices for storing and reading program and other data. Examples of such data storage devices include a hard disk drive 110 for reading from and writing to a hard disk (not shown), a magnetic disk drive 112 for reading from or writing to a removable magnetic disk (not shown), and an optical disc drive 114 for reading from or writing to a removable optical disc (not shown), such as a CD-ROM or other optical medium. A monitor 122 is connected to the system bus 108 through an adapter 124 or other interface. Additionally, the data-processing apparatus 100 can include other peripheral output devices (not shown), such as speakers and printers. Additionally, a user input device 127 such as a keyboard and/or mouse can be connected to system bus 108 in order to permit users to input data, commands and instructions to data-processing apparatus 100.

The hard disk drive 110, magnetic disk drive 112, and optical disc drive 114 are connected to the system bus 108 by a hard disk drive interface 116, a magnetic disk drive interface 118, and an optical disc drive interface 120, respectively. These drives and their associated computer-readable media provide nonvolatile storage of computer-readable instructions, data structures, program modules, and other data for use by the data-processing apparatus 100. Note that such computer-readable instructions, data structures, program modules, and other data can be implemented as a module 107.

Note that the embodiments disclosed herein can be implemented in the context of a host operating system and one or more module(s) 107. In the computer programming arts, a software module can be typically implemented as a collection of routines and/or data structures that perform particular tasks or implement a particular abstract data type.

Software modules generally comprise instruction media storable within a memory location of a data-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product that can be implemented through signal-bearing media, including transmission media and recordable media.

It is important to note that, although the embodiments are described in the context of a fully functional data-processing apparatus such as data-processing apparatus 100, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

Any type of computer-readable media that can store data that is accessible by a computer, such as magnetic cassettes, flash memory cards, digital versatile discs (DVDs), Bernoulli cartridges, random access memories (RAMs), and read only memories (ROMS) can be used in connection with the embodiments.

A number of program modules can be stored or encoded in a machine readable medium such as the hard disk drive 110, the, magnetic disk drive 114, the optical disc drive 114, ROM, RAM, etc or an electrical signal such as an electronic data stream received through a communications channel. These program modules can include an operating system, one or more application programs, other program modules, and program data.

The data-processing apparatus 100 can operate in a networked environment using logical connections to one or more remote computers (not shown). These logical connections are implemented using a communication device coupled to or integral with the data-processing apparatus 100. The data sequence to be analyzed can reside on a remote computer in the networked environment. The remote computer can be another computer, a server, a router, a network PC, a client, or a peer device or other common network node. FIG. 1 depicts the logical connection as a network connection 126 interfacing with the data-processing apparatus 100 through a network interface 128. Such networking environments are commonplace in office networks, enterprise-wide computer networks, intranets, and the Internet, which are all types of networks. It will be appreciated by those skilled in the art that the network connections shown are provided by way of example and that other means of and communications devices for establishing a communications link between the computers can be used.

Real-Time Screening Interface

Figure 2:
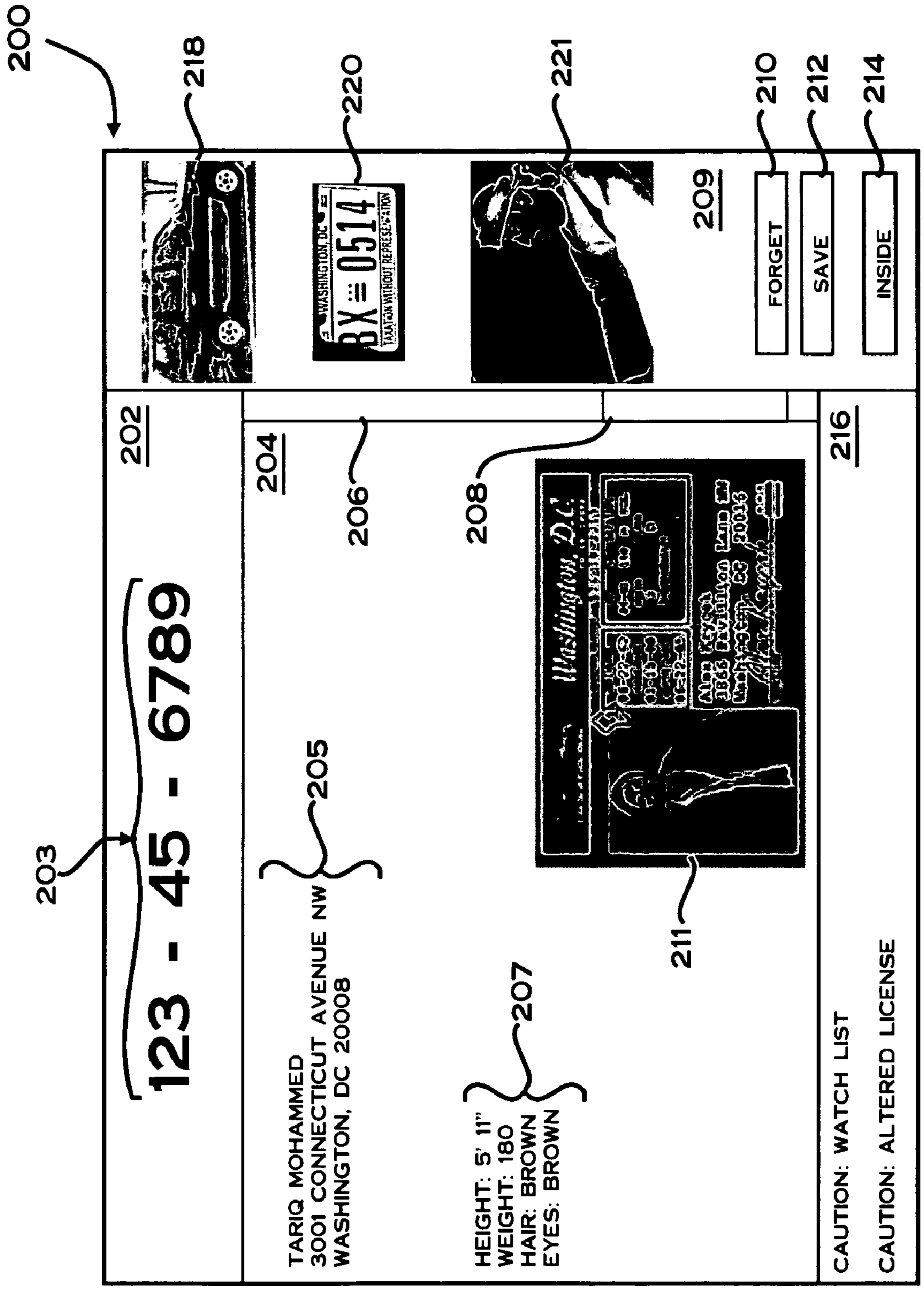
FIG. 2 illustrates a pictorial diagram of a graphically-displayed user interface that can be implemented in accordance with a preferred embodiment.

FIG. 2 illustrates a pictorial diagram of a graphically-displayed user interface 200 that can be implemented in accordance with a preferred embodiment. User interface 200 permits a screener to verify the identity of a vehicle occupant at a safe distance from an entrance to a secure facility. User interface 200 can be implemented in the context of an electronic drive-up kiosk. User interface 200 can be provided as an officer console that permits screening personnel such as security guards to rapidly acquire necessary identification information while simultaneously communicating with a driver via an audio link. The interface 200 is designed to acquire and present key identify information to the screening personnel, including indications of the progress in searching external data (e.g., "watch lists") for information matches, and the results of such searches. The interface 200 is designed so that the screener may instruct the driver to leave the kiosk at any time, or to flag the vehicle for additional screening.

Interface 200 constitutes a GUI that includes a graphical display area 202 that displays the social security number or other identification number associated with a vehicle occupant. A graphical display area 204 also displays data 205 and 207 associated with the vehicle occupant. Data 205, for example, may be the address of the vehicle occupant. Data 207 may be, for example, information about the vehicle occupant's height, weight, hair color, eye color, and so forth. Additionally, a copy of the vehicle occupant's driver's license or other identification data 211 can be displayed within display area 204 for screening personnel. A graphically displayed slider 208 can also be located within a scroll bar 206 within the display area 204, which permits a user to move "up" and "down" using, for example, a user input device such as the user input device 127 of the data-processing apparatus 100 depicted in FIG. 1, by selecting slider 208 for scrolling through the display area 204.

Interface 200 can be implemented by, for example, a windows-based operating system and displayed via a monitor such as monitor 122, also depicted in FIG. 1. Interface 200 further includes a graphical display area 216 that provides alerts and data, such as, for example, information indicating that the vehicle occupant is on a "watch list" and that he or she has submitted an altered license. Additionally, interface 200 can display a real-time video camera view 218 of the vehicle occupant's automobile, along with a real-time video camera view 220 of the vehicle's license plate. A real-time video camera view 221 of the vehicle occupant can also be provided. The camera views 221, 220 and 218 can be displayed within a graphical area 209 of the interface 200.

Alternatively, views 218, 220 and 221 may be presented as still camera shots instead of real-time video, depending upon design considerations. A real-time live video feed may not be necessary as simple camera shots may be sufficient for screening purposes. Several interactive graphical buttons 210, 212, 214 can also be displayed within the graphical area 209, which when respectively selected by a user via a user input device (e.g., user input device 127) permit the screening personnel to activate "forget," "save" and "inside" operations.

Interface 200 is thus a screening interface that includes one or more areas 202 and 204 for the display of information entered by the driver. Interface 200 can display information extracted from the drivers ID, information extracted by relevant cameras, and information returned by various databases. A small number of controls ("buttons") 210, 212, 214 are all that is needed to facilitate the handling of the information associated with each vehicle. The screener may at any time terminate screening and allow the driver to proceed. The system automatically returns to a neutral state. Any adverse information about the driver will be prominently displayed within interface 200 so that the screener can take appropriate action.

Figure 3:
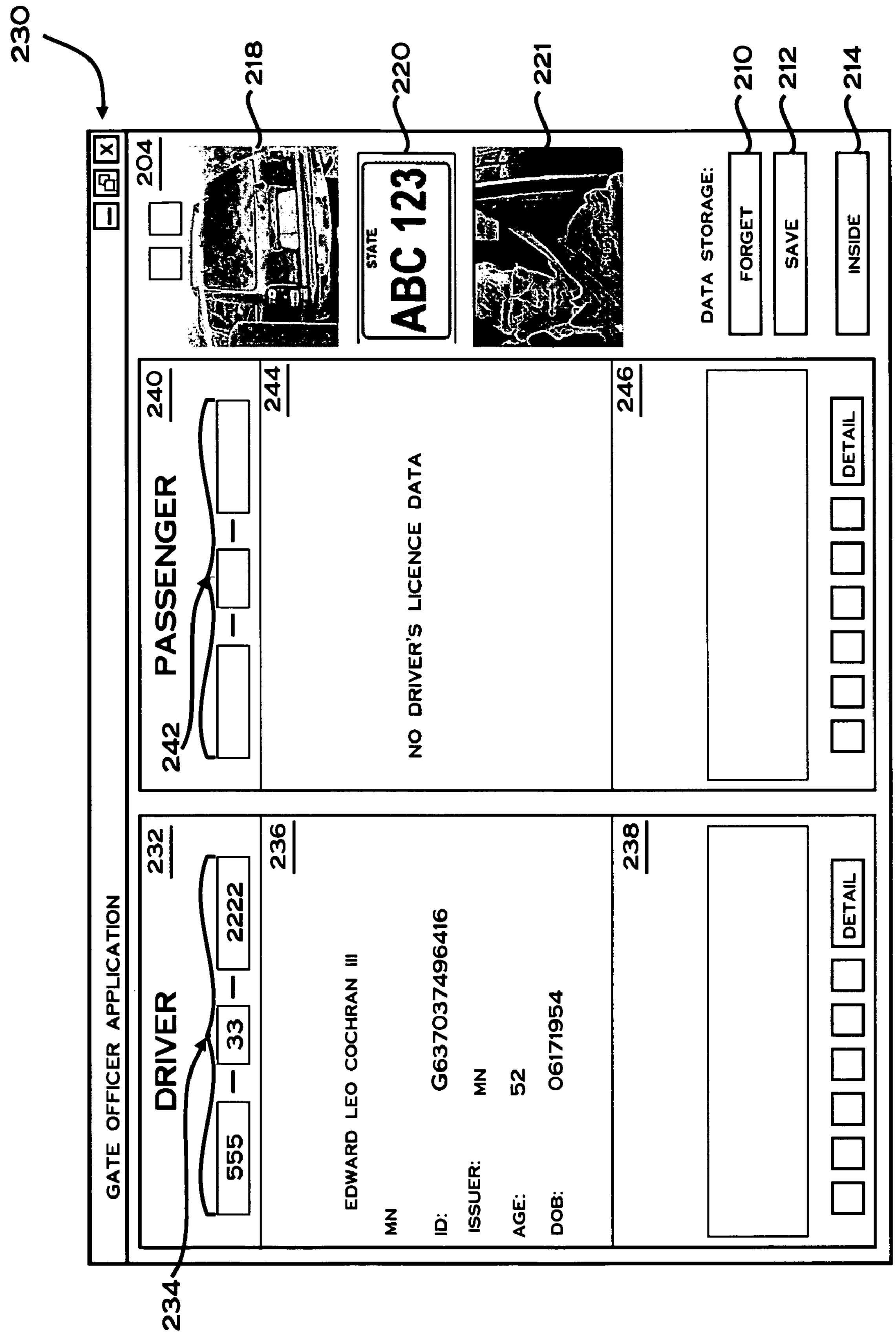
FIG. 3 illustrates an example of an interface that can be implemented in accordance with an alternative embodiment.

FIG. 3 illustrates an example of an interface 230 that can be implemented in accordance with an alternative embodiment. Interface 230 represents an alternative version of the interface 200 depicted in FIG. 2. Note that in FIGS. 2-3, identical or similar parts or elements are generally indicated by identical reference numerals. Thus, interface 230 includes the same display area 209 as depicted in FIG. 2. Interface 230, however, also includes display areas 232, 236, and 238 devoted to information about the driver. Display areas 240, 244, and 246 provided by interface 230 are dedicated to displaying information concerning a passenger in the same car as the driver. A field 234 within display area 232 provides the driver's social security number or other identification number. Display area 236 displays driver's license data input by the driver to the kiosk. Display area 238 can display additional information concerning the driver. In the example illustrated in FIG. 3, there is no information about the passenger within display areas 240, 244, and 246, but such information would be available if provided by the electronic drive-up kiosk or by a passenger.

Secondary Screening

Figure 4:
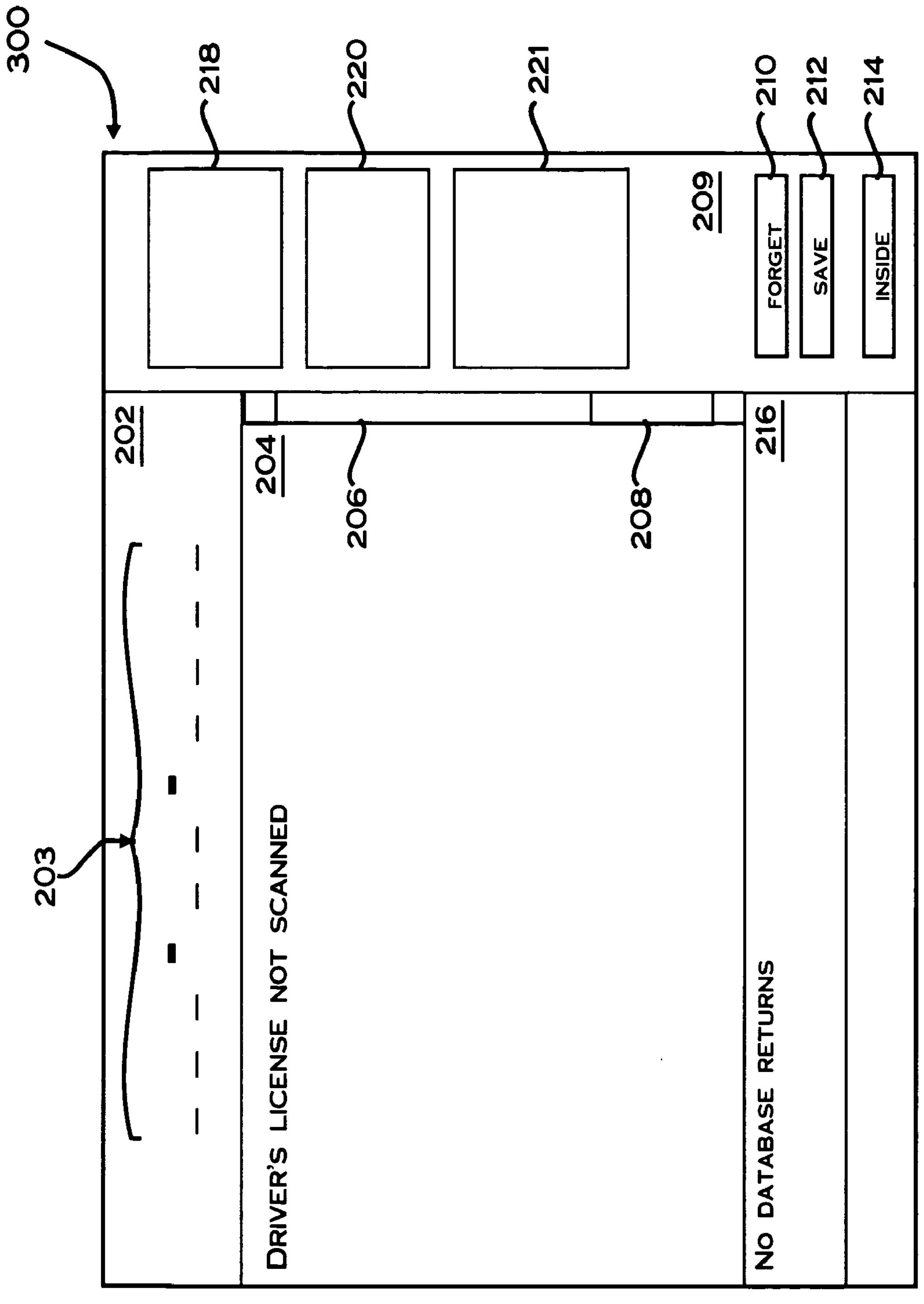
FIG. 4 illustrates a screening interface, which can be implemented in accordance with an alternative embodiment.

FIG. 4 illustrates a screening interface 300, which can be implemented in accordance with an alternative embodiment. Note that in FIGS. 2-4, identical or similar parts or elements are generally indicated by identical reference numerals. Screening interface 300 can be used by a screener to validate the identity of the occupant(s) of vehicles at the entrance to a secured facility, if those vehicles have been designated for such validation after an initial screening at a safe distance. Interface 300 permits screening personnel to rapidly acquire necessary identification information from drivers who have been referred for additional validation from a primary screening in a remote location. The interface 300 presents a prioritized list of vehicles awaiting secondary screening, allows screening personnel to select vehicles from that list, acquire key identity information from vehicle occupants, and search external data ("watch lists") for matches of that information. The interface 300 is designed so that screening personnel do not have to complete screening of any occupant or any vehicle in any particular order, thereby enabling them to flexibly respond to screening needs as they arise.

The interface 300 can be displayed in the context of a display screen operating with, for example, 1024×768 pixels. Some prototypes may provide for screens sized, 8"×6", which maintains the aspect ratio in scale whereby 1"=128 pixels, 0.5"=64 pixels, and 0.25"=32 pixels. These are, of course, merely suggested parameters and the actual implementation of interface 300 will likely vary greatly from such scales. The resolution may also vary.

The screening interface 300 generally includes two primary screens, a car list screen and a car information screen. Cars visiting the gate can be listed in a selection screen unless they are specifically marked "forget" or removed due to timeout. The car information shown in the selection screen includes a photo of the vehicle, the license plate, a photo of the driver, the time the car arrived, and the driver's name. Vehicles in this list are sorted by a combination of priority and arrival time. When a vehicle is selected from the car selection screen, the car information screen is presented. This screening interface 300 essentially contains the same information as the officer console interface 200 depicted in FIG. 1, except that it allows a secondary screener to modify some of the information and add additional occupants. Modifying information for the occupant triggers fresh queries against a watch list database. The configuration of interface 300 displays an empty officer console in which the driver's license has not been scanned; database information has not been returned, and so forth.

Figure 5:
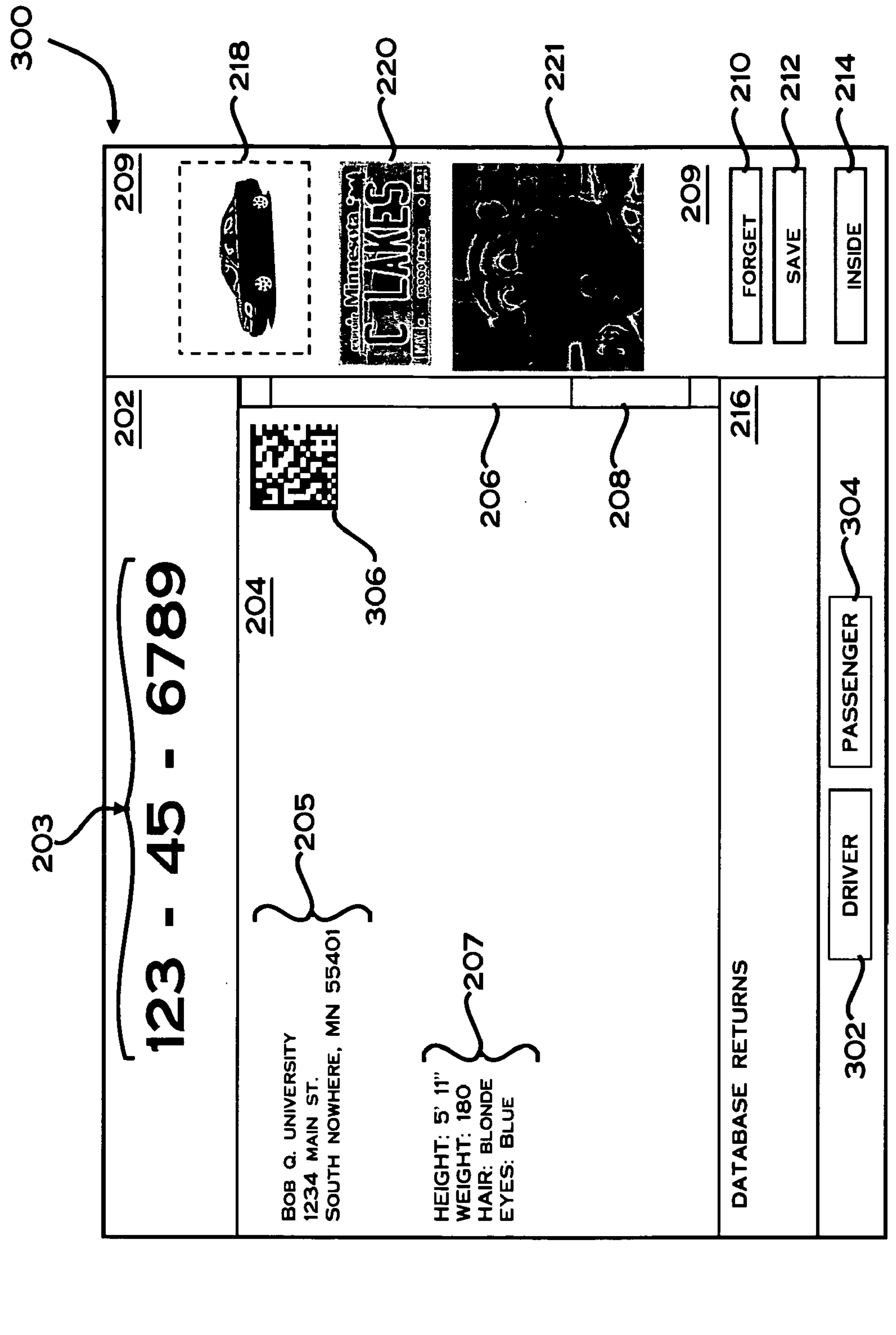
FIG. 5 illustrates an alternative view of the screening interface, in accordance with an alternative embodiment.

FIG. 5 illustrates an alternative view of the screening interface 300, in accordance with an alternative embodiment. The screening interface 300 is shown as an officer console with data displayed within the interface 300. Note that in FIGS. 2-5. Thus, for example, driver's license data 205, 207 is displayed within the display area 204. Similarly, the social security number of a vehicle occupant or driver is displayed as identification data 203 within display area 202. Additional buttons 302 and 304 can be displayed within interface 300, which permit screening personnel to view information respectively concerning a vehicle driver or a vehicle passenger.

In general, a loop sensor can be utilized to detect the presence of an automobile. A photo of the car can be populated, along with a rendering of the license plate and a photo of the driver. The driver then enters his or her social security number or other identifier and presses "OK" on a social security screen of the kiosk. The social security number is then populated and can be displayed as information 203 within display area 202 of interface 300. The driver can then "swipe" his or her driver's license. If the license was in a slot A of the kiosk, a picture of a data stamp associated with the driver's license is populated and the detail window is filled with the information from the data stamp. A picture 306 of the data stamp can thus be displayed within display area 204 of interface 300. Driver's license data can be displayed, for example, as data 205, 207 within display area 204. If the license was in a slot B of the kiosk, a picture 211 (e.g., see FIG. 2) of the license can be placed in the detail area 204.

An officer can enter the social security number of the vehicle occupant into a "high side" computer. The system can then send a query to a local database. If a response is not found, the database returns information to display area 216 populated with the string "Not found in local database." or "No flags in local database." If a flag is found, however, the database can return data to area 216 populated with the string "CAUTION:" followed by the results obtained from the database. FIG. 2, for example, displays examples of "caution" information in display area 216.

In a "normal" scenario, no problems will be presented by the "high side" computer, and no flags would be generated by the database. Additionally, no other suspicions would be raised and the officer would take no action and would simply raise the gate to allow the vehicle to pass on to the secured facility. There may be situations, however, where the officer will simply send the driver of the car inside. This may happen for several reasons. For example, there may be too many occupants within the automobile, or too many cars may be lined up. The officer then presses the "inside" button 214 and the particular identified car is added to a pending queue. The screen is cleared, and the car may be allowed to pass by raising the security gate.

Another situation may arise where the officer "forgets" a car. Such a scenario may occur if the entry is to be purged from the database, and not even stored for a limited amount of time. The officer simply presses the "forget" button 210. This situation may occur, for example, if the entry is to be purged from the database. In other words, the data concerning a particular vehicle and/or vehicle occupant is discarded. The screen is cleared and the officer continues to raise the gate. The opposite situation may occur, that is, where the officer "saves" the car. That is, this situation occurs if the entry is to be saved indefinitely. The office simply presses/selects the "save" button 210 located in the display area 209. The data are marked for permanent storage and the screen can then be cleared by the officer, who can continue to raise the security gate to allow the vehicle to pass.

The situation where the officer raises the gate is common to all cars. The office presses a "gate" button (not shown in FIGS. 2-5). The gate raises, and the car passes through the gate. When the car leaves the loop, the screen is cleared. In the general, the interaction with the system described herein always remains the same, and may only be required if special action is to be taken with the data. The officer does not have a second chance to activate the Inside, Forget, or Save the data operations. Provisions can be provided if an officer, for example, accidentally "clicks" one of these buttons. Also, when the driver of a car is sent inside, it may be desirable for the officer to add notes via the interface 300 about why this situation occurred.

Figure 6:
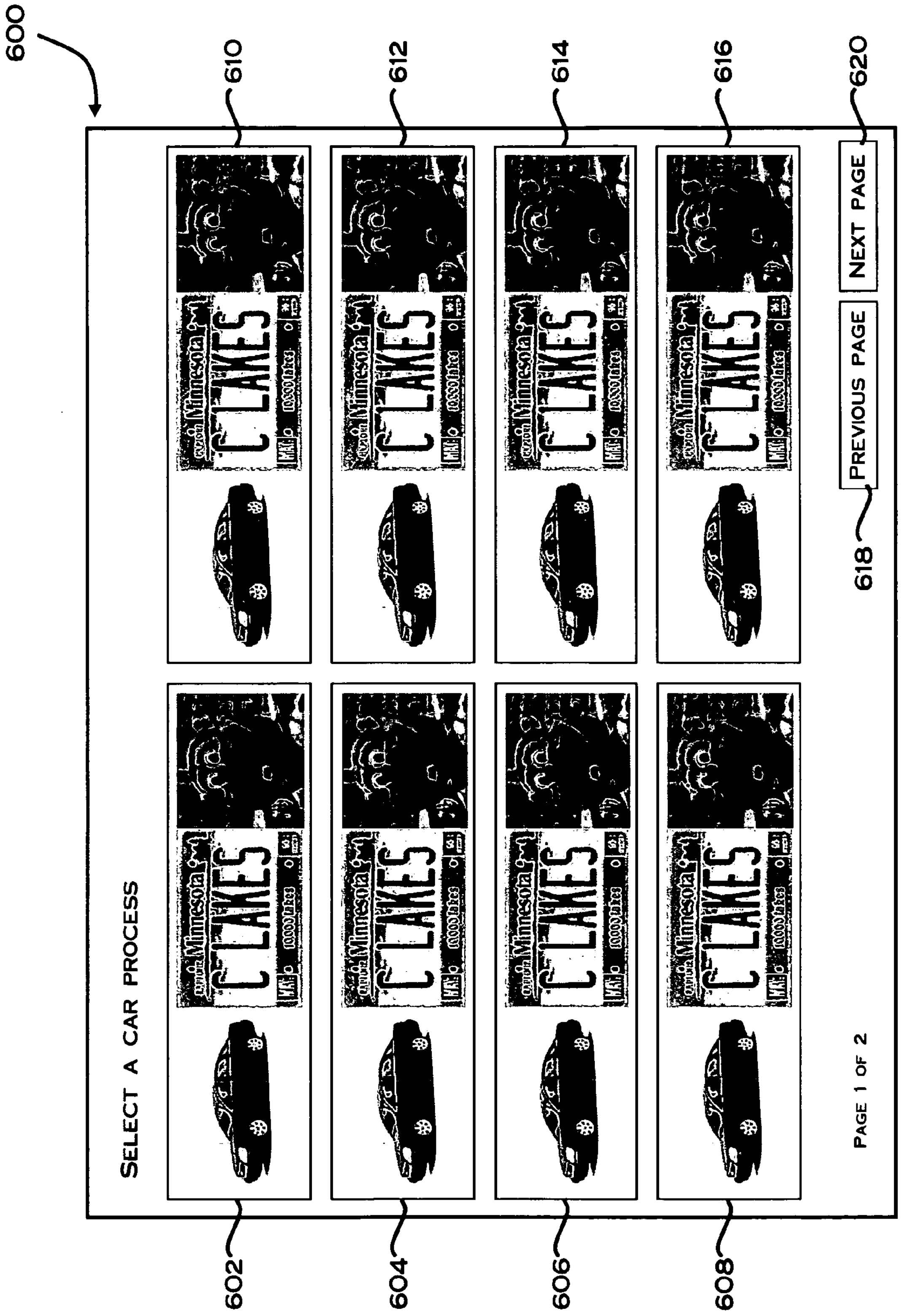
FIGS. 6-7 illustrate a console car selection interface, which can be implemented in accordance with an alternative embodiment.
Figure 7:
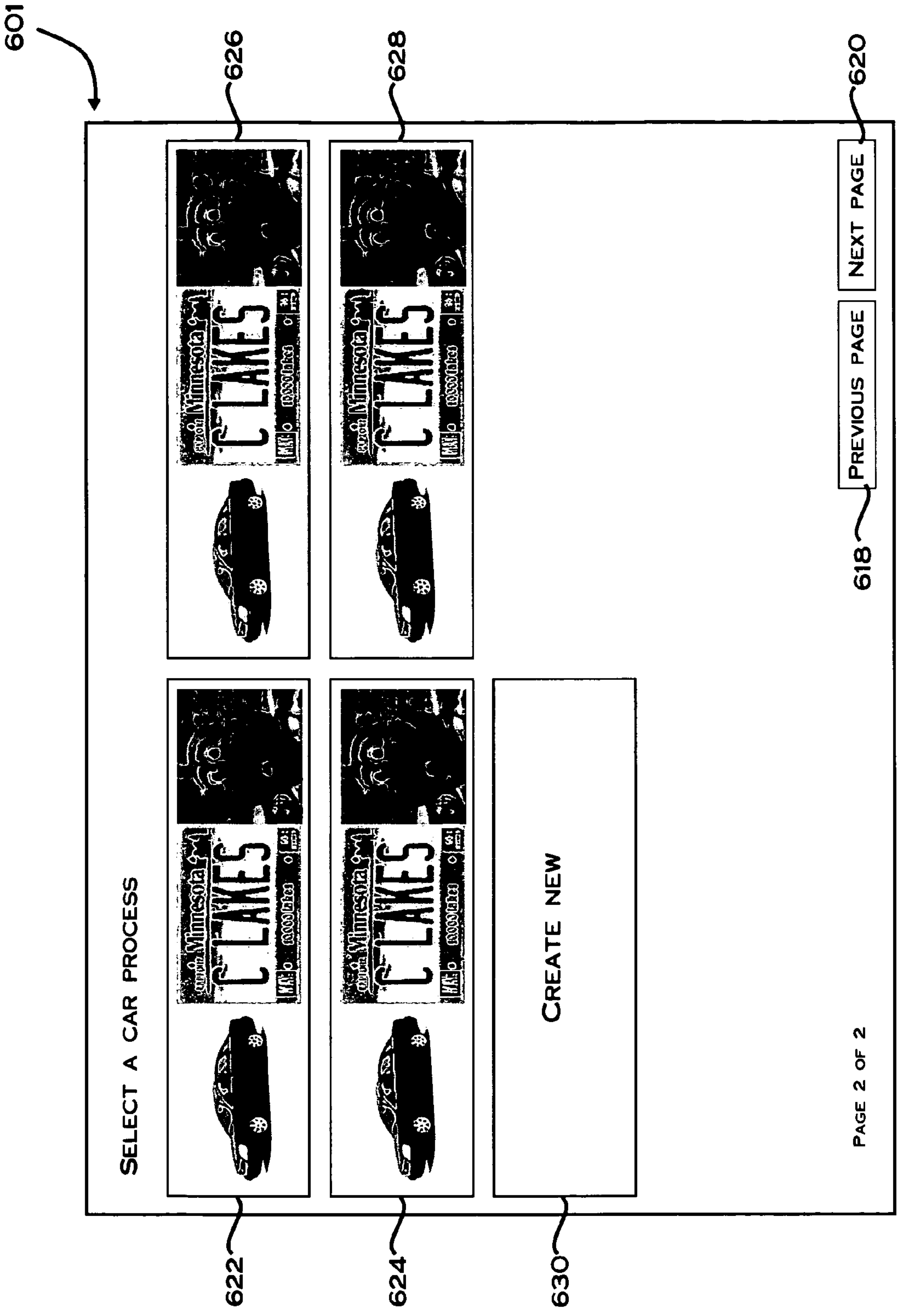

FIGS. 6-7 illustrate a console car selection interface 600, 602 which can be implemented in accordance with an alternative embodiment. Interface 600, 602 essentially represents pages 1-2 of the same user interface. Interface 600, 602 permits a car to be processed from among a plurality of cars in-line or waiting at the security gate. By graphically selecting from among one or more displayed buttons 602, 604, 606, 608, 610, 612, 614, 616, 622, 624, 626, 628, a user can select a particular car for security processing. Note that each button 602, 604, 606, 608, 610, 612, 614, 616, 622, 624, 626, 628 includes a picture of the car in question along with a photo of the car's license plate. Interface 600, 602 also includes buttons 618, 620, which permit the user to switch between graphically displayed "pages" of the interface 600, 602. Additionally, a button 630, when selected by the officer, permits the creation of a new entry concerning a particular vehicle and/or vehicle occupant.

FIGS. 8, 9, 10, and 11 illustrate alternative versions of screening interface 300, in accordance with an alternative embodiment. Note that in FIGS. 1-12, identical or similar parts or elements are generally indicated by identical reference numerals. In the illustration depicted in FIGS. 8-11, varying passenger information and data can be viewed and accessed by the security personnel. Additionally, graphical selections buttons 802 and 804 can be provided for switching between previous and "next" passenger information screens. Additionally, a car selection button 808 can be provided, which permits the officer to select a particular car and associated information for processing and information viewing purposes. A "finished" button 806 is also depicted in FIGS. 8-11.

Figure 8:
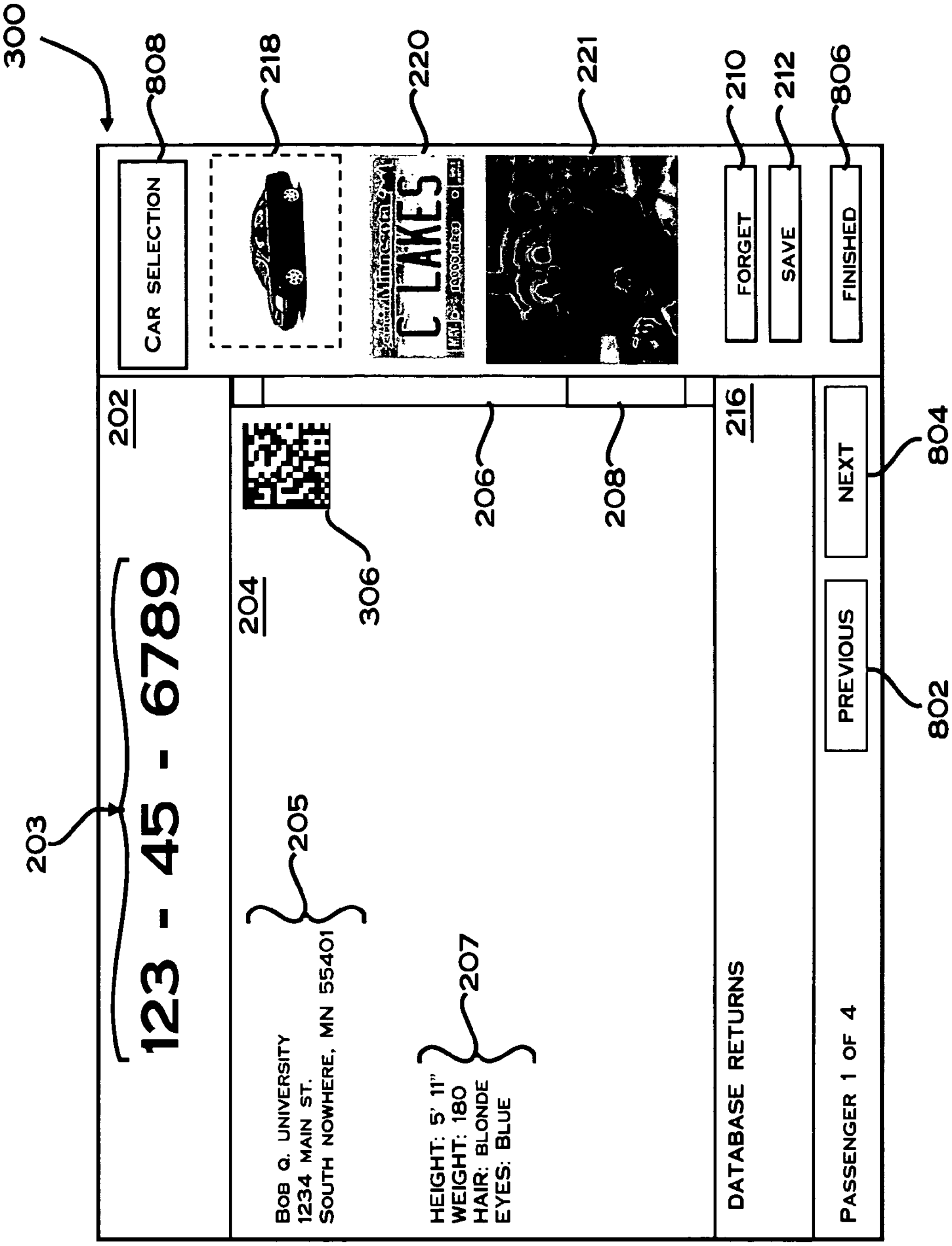
FIGS. 8, 9, 10, and 11 illustrate alternative versions of screening interface, in accordance with an alternative embodiment.
Figure 9:
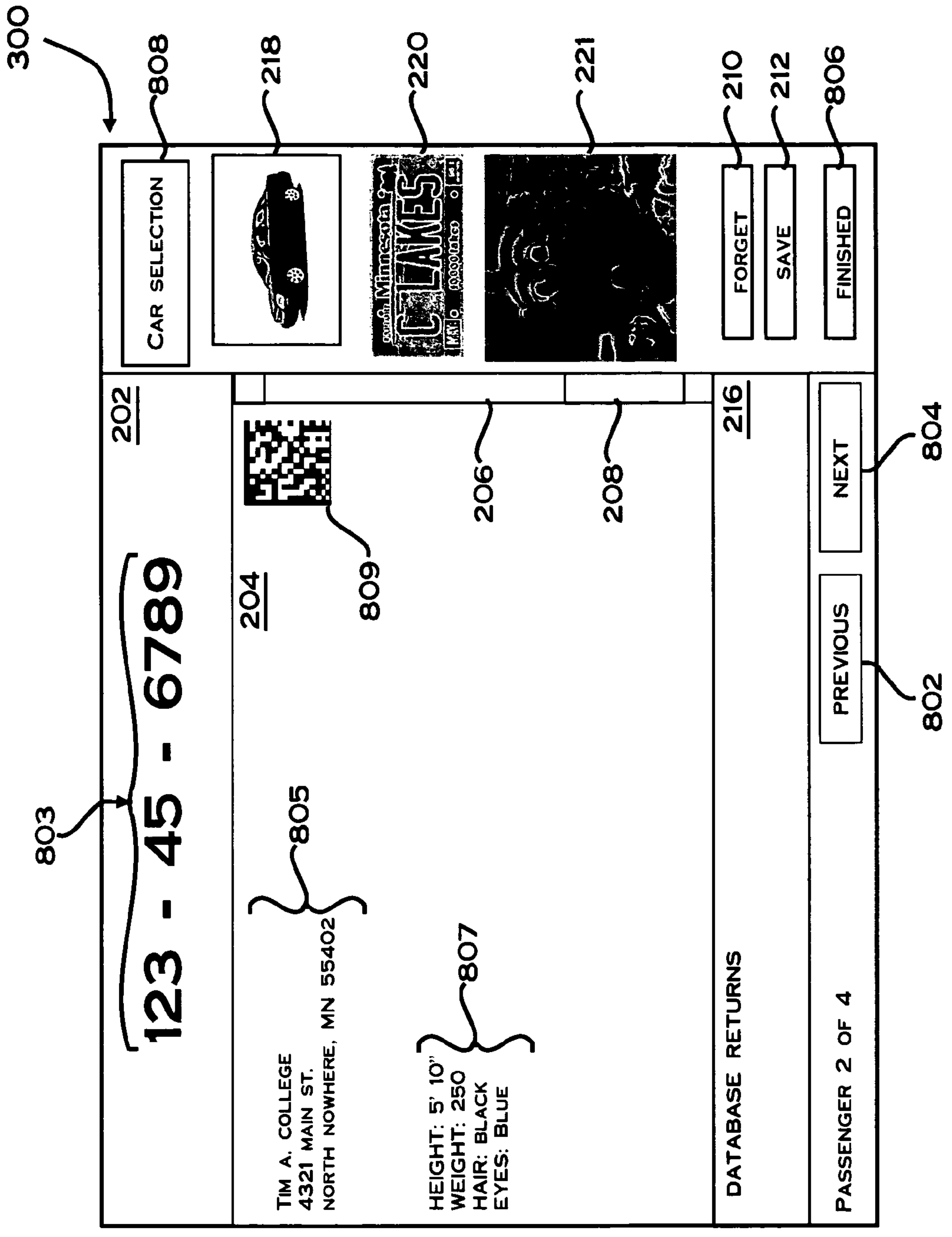
Figure 10:
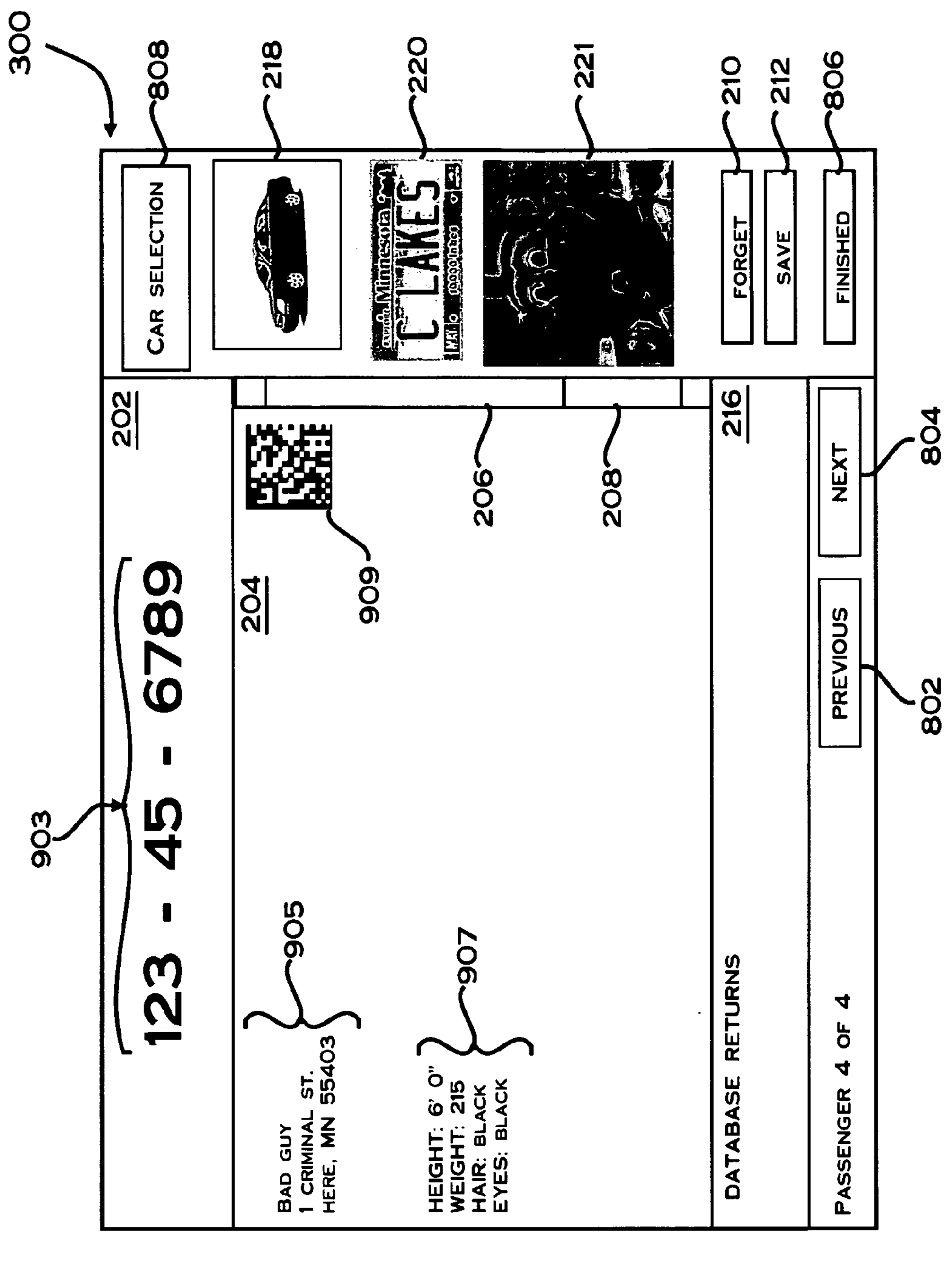
Figure 11:
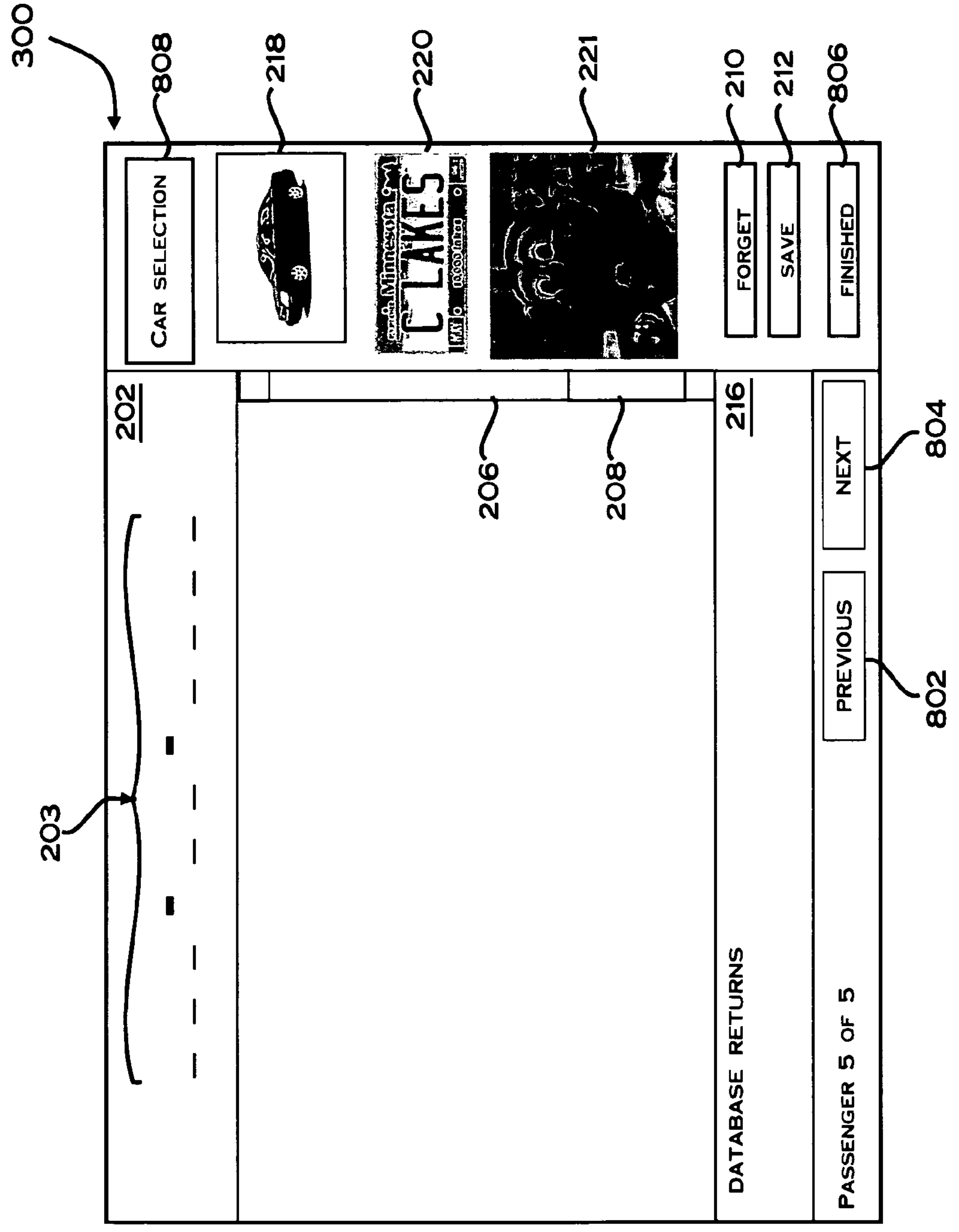

FIG. 8 depicts "passenger 1" information, while FIG. 9 depicts "passenger 2" information. In FIG. 9, for example, a different set of data 803 and 805, 807 are respectively displayed within display areas 202, 204. A different data stamp 809 associated with the passenger driver's license is also displayed in display area 204. Similarly, in FIG. 10, "passenger 4" information includes different data 903 and 905, 907 along with a different data stamp 909. FIG. 11 also includes a "blank" interface 300 for "new passenger" information.

Figure 12:
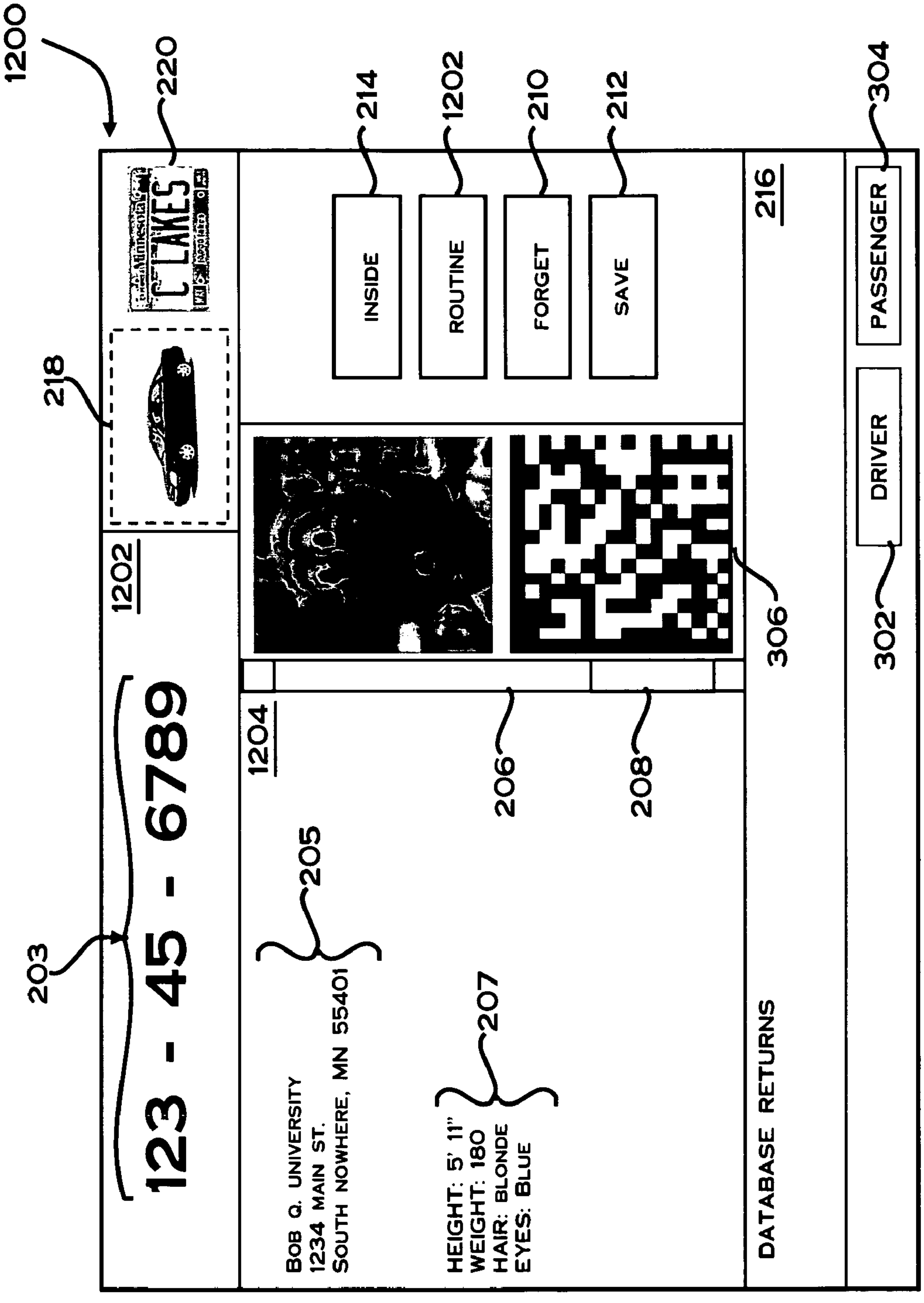
FIG. 12 illustrates an interface, which can be implemented in accordance with an alternative embodiment.

FIG. 12 illustrates an interface 1200, which can be implemented in accordance with an alternative embodiment. Note that in FIGS. 1-12, identical or similar parts or elements are generally indicated by identical reference numerals. Interface 1200 includes for example, a display are 1202 for displaying social security information associated with a particular vehicle driver or occupant. A display area 1204 is also depicted in which driver's license data 205, 207 are displayed. A button 1202 can be selected for processing a particular screening routine.

Kiosk User Interface

Figure 13:
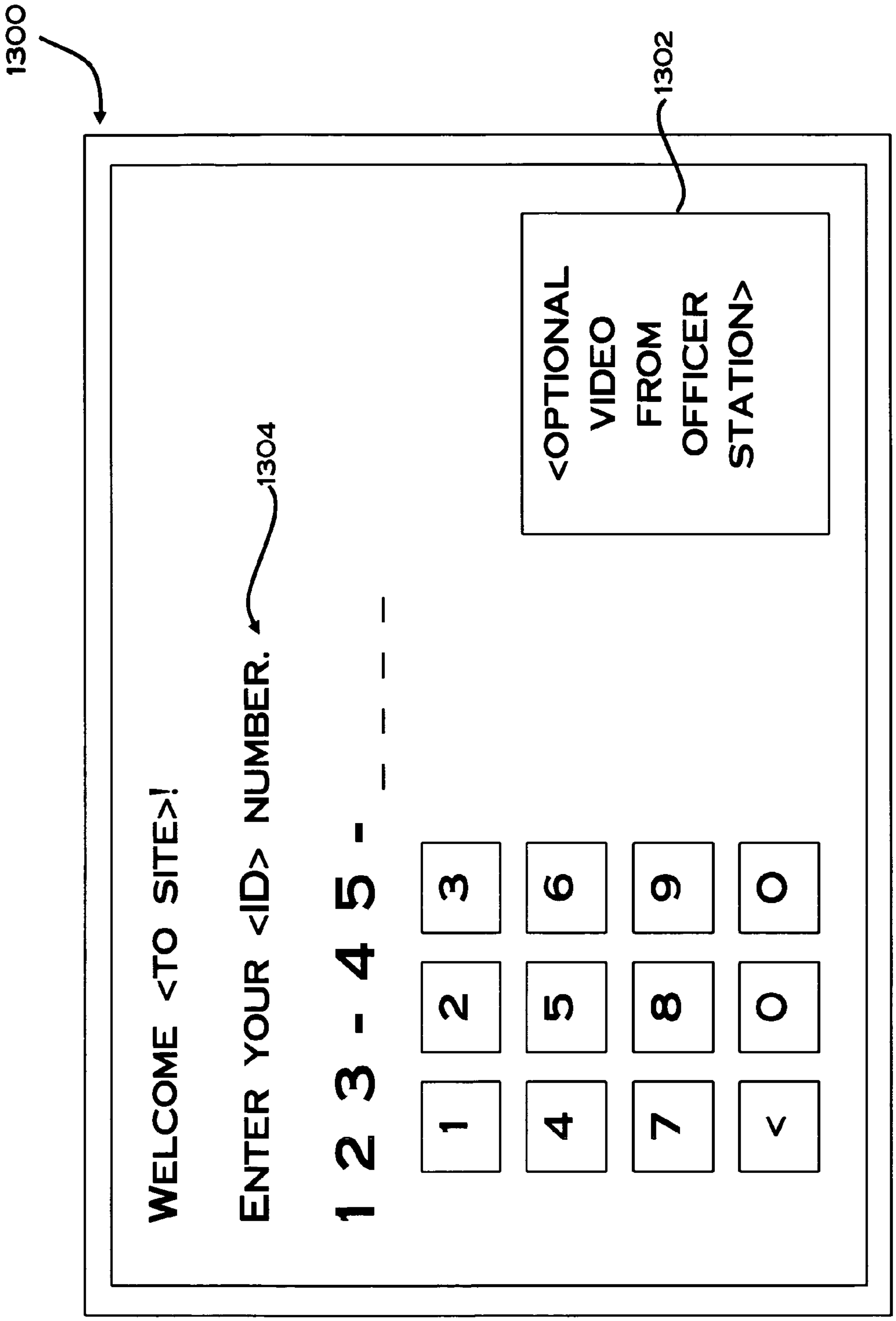
FIG. 13 illustrates a kiosk user interface screen, in accordance with an alternative embodiment.

FIG. 13 illustrates a kiosk user interface screen 1300, in accordance with an alternative embodiment. Note that in FIGS. 13-15, identical or similar parts or elements are generally indicated by identical reference numerals. Interface screen 1300 generally displays information 1304 that prompts a user to enter his or her unique ID number, such as a social security number into the kiosk. An optional video display area 1302 may be included within interface screen 1300 in order to provide video to the user from a security officer station.

Figure 14:
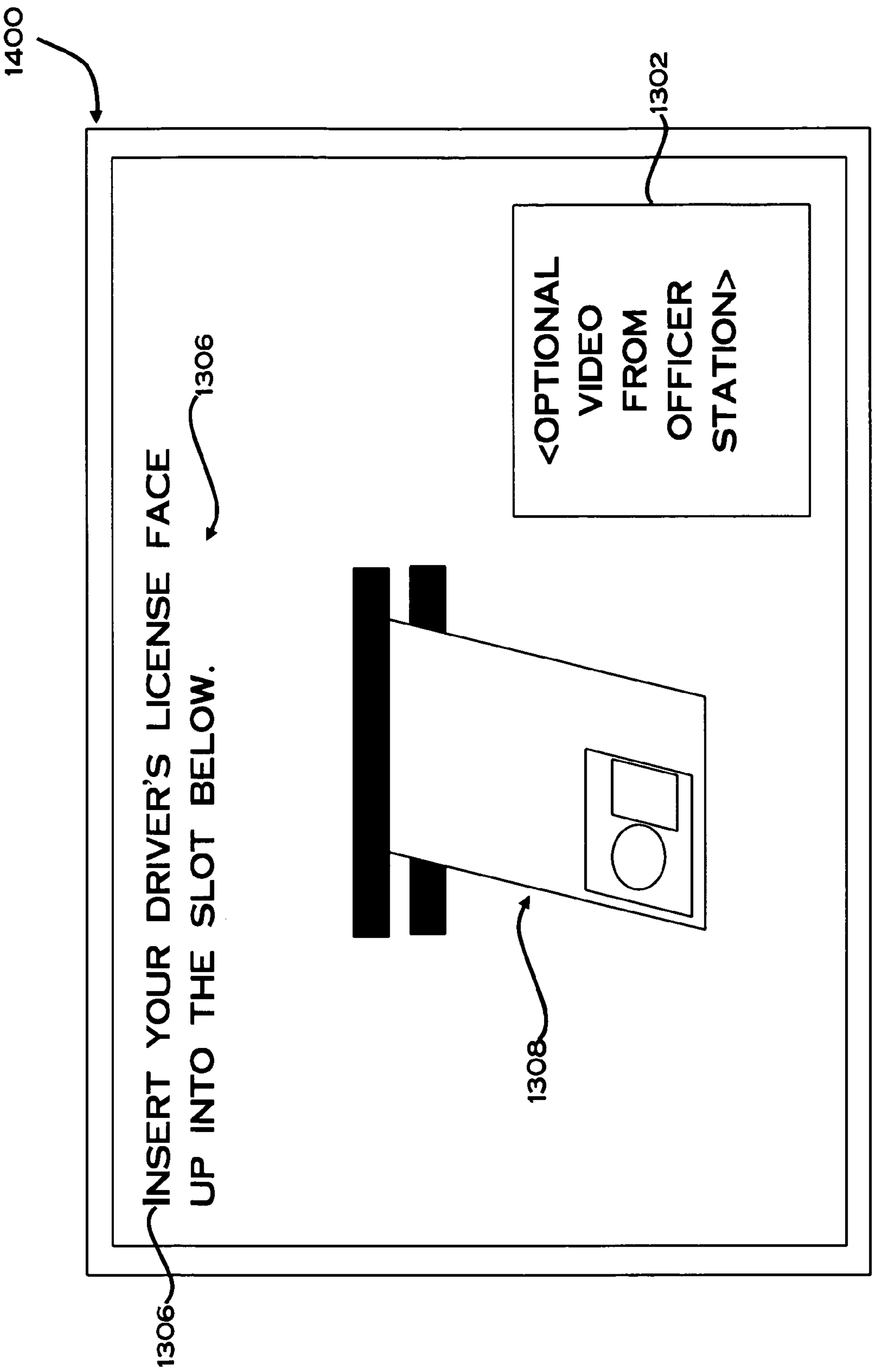
FIG. 14 illustrates a kiosk user interface screen, in accordance with an alternative embodiment.

FIG. 14 illustrates a kiosk user interface screen 1400, in accordance with an alternative embodiment. Interface screen 1400 instructs the user to insert his or her driver's license face up into a card reader slot associated with the kiosk. The optional video display area 1302 can also be included within interface screen 1400 in order to provide video to the user from a security officer station.

Figure 15:
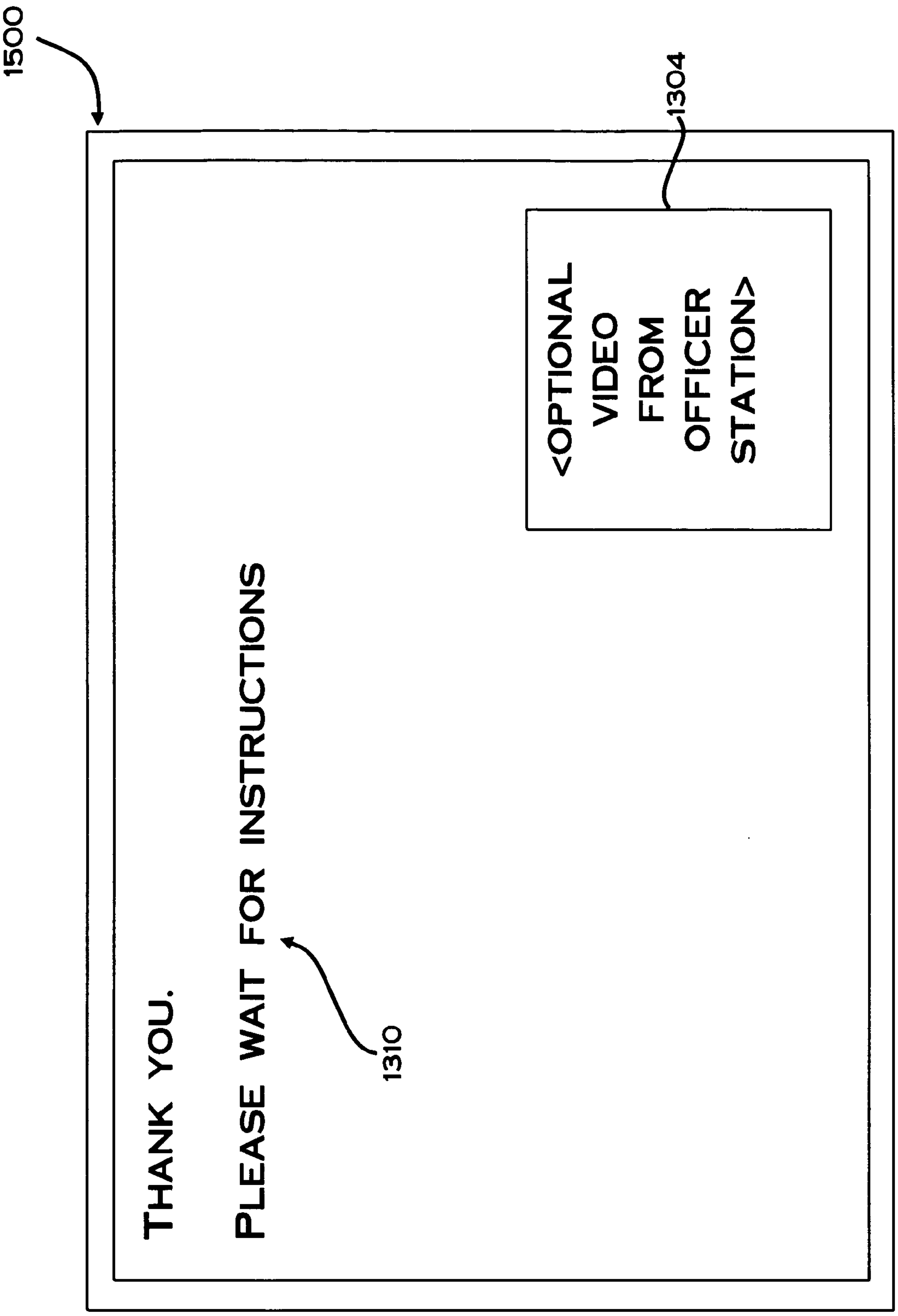
FIG. 15 illustrates a kiosk user interface screen, in accordance with an alternative embodiment.
Figure 16:
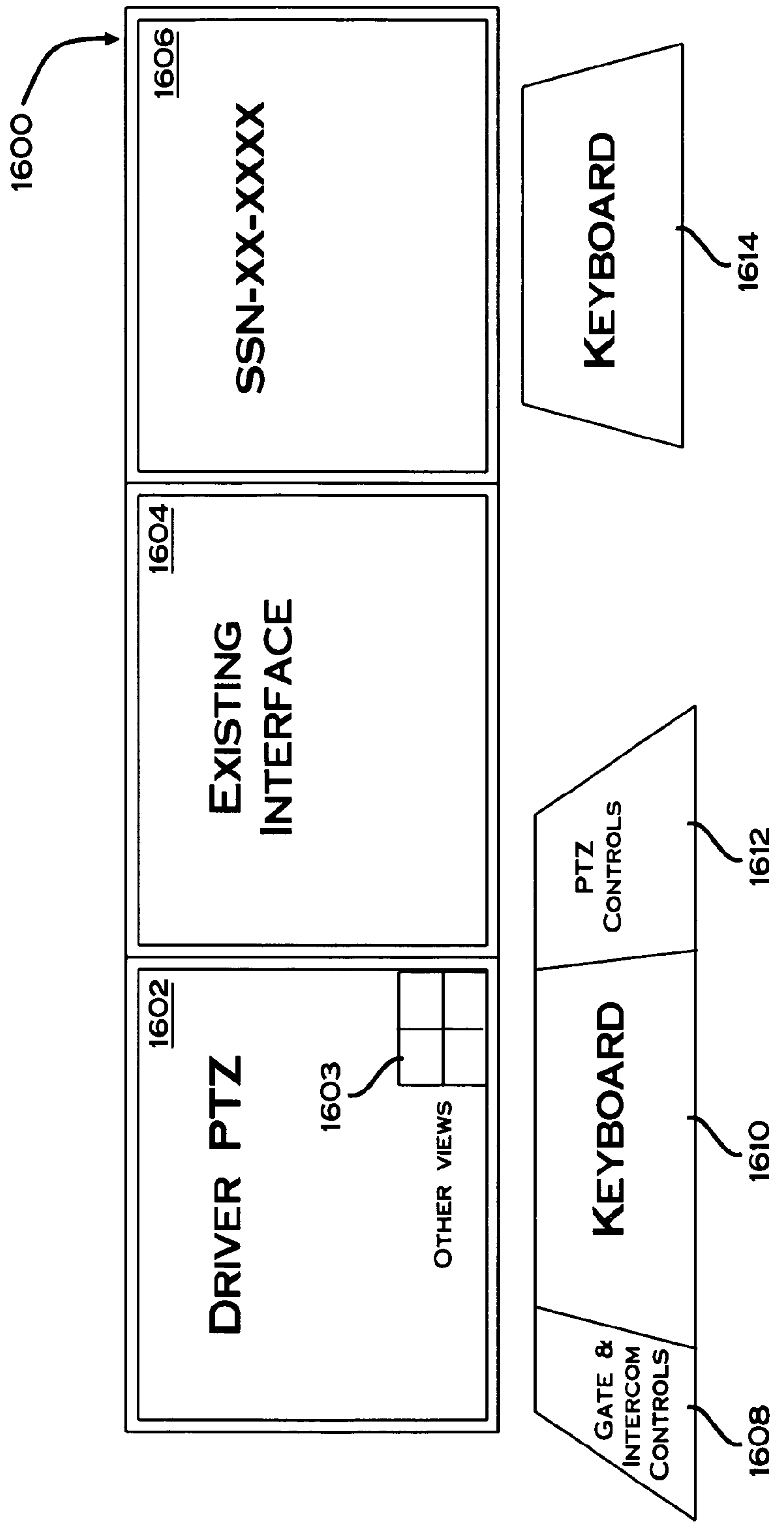
FIGS. 16, 17, 18, 19, 20 and 21 generally describe varying aspects of an officer console, which can be implemented in accordance with an alternative embodiment.

FIG. 15 illustrates a kiosk user interface screen 1500, in accordance with an alternative embodiment. Interface screen 1500 advises the user to wait for additional instructions after the user has inserted his or her driver's license into the card reader associated with the kiosk. The optional video display area 1302 can also be included within interface screen 1500 in order to provide video to the user from a security officer station.

The kiosk user interface screens 1300, 1400, 1500 described above are used to screen a vehicle and verify the identity of its occupants at a safe distance from the entrance to a secured facility. The design permits a vehicle driver to rapidly enter necessary identification information while simultaneously communicating with screening personnel via an audio link. The interface is designed so that the driver may leave the kiosk at any time, based upon instructions from the screener.

Thus, an initial screen 1300 welcomes visitors and provides a message of the day. A data entry screen permits ID # to be entered on a touch screen, using a calculator-like keypad, with keys for correcting mistakes and sending the data. An instruction screen 1400 shows how to insert an ID card into the provided slots. A final screen 1500 acknowledges receipt of data, asks drivers to wait, and can provides a way to enter data for a passenger (e.g., by recycling through first screens).

FIGS. 16-21 generally describe varying asserts of an officer console 1600, which can be implemented in accordance with an alternative embodiment. The officer console includes one or more display screens 1602, 1604, and 1606. One or more keyboards 1614, 1610 are also provided as part of the officer console 1614. Keyboards 1614, 1610 are analogous to the user input device 127 of the data-processing apparatus 100 depicted in FIG. 1. Additionally, display screens 1602, 1604, and 1606 are analogous to the monitor 122 depicted in FIG. 1.

The hardware components depicted in FIGS. 16-21 can thus be implemented as part of a data-processing apparatus, such as, for example, data-processing apparatus 100. Keyboard 1610 is generally associated with a user input section 1608 that provides for gate and intercom controls. Keyboard 1610 can also be associated with a user input section 1612 that provides for PTZ (Pan Tilt Zoom) controls. Display screen 1602 can provides varying views of the driver and/or vehicle, including "other views" 1603 of the driver and/or vehicle. A security officer can utilize the PTZ controls provided by user input section 1612 in order pan, tilt or zoom the cameras for better views of the driver and/or vehicle in question. Display screen 1604 provides for an existing interface for viewing the driver and/or vehicle, while display screen 1606 can be used to view data (e.g., social security number) provided by the driver and/or vehicle occupants via the kiosk interface screens 1300, 1400, and 1500 described earlier.

Figure 17:
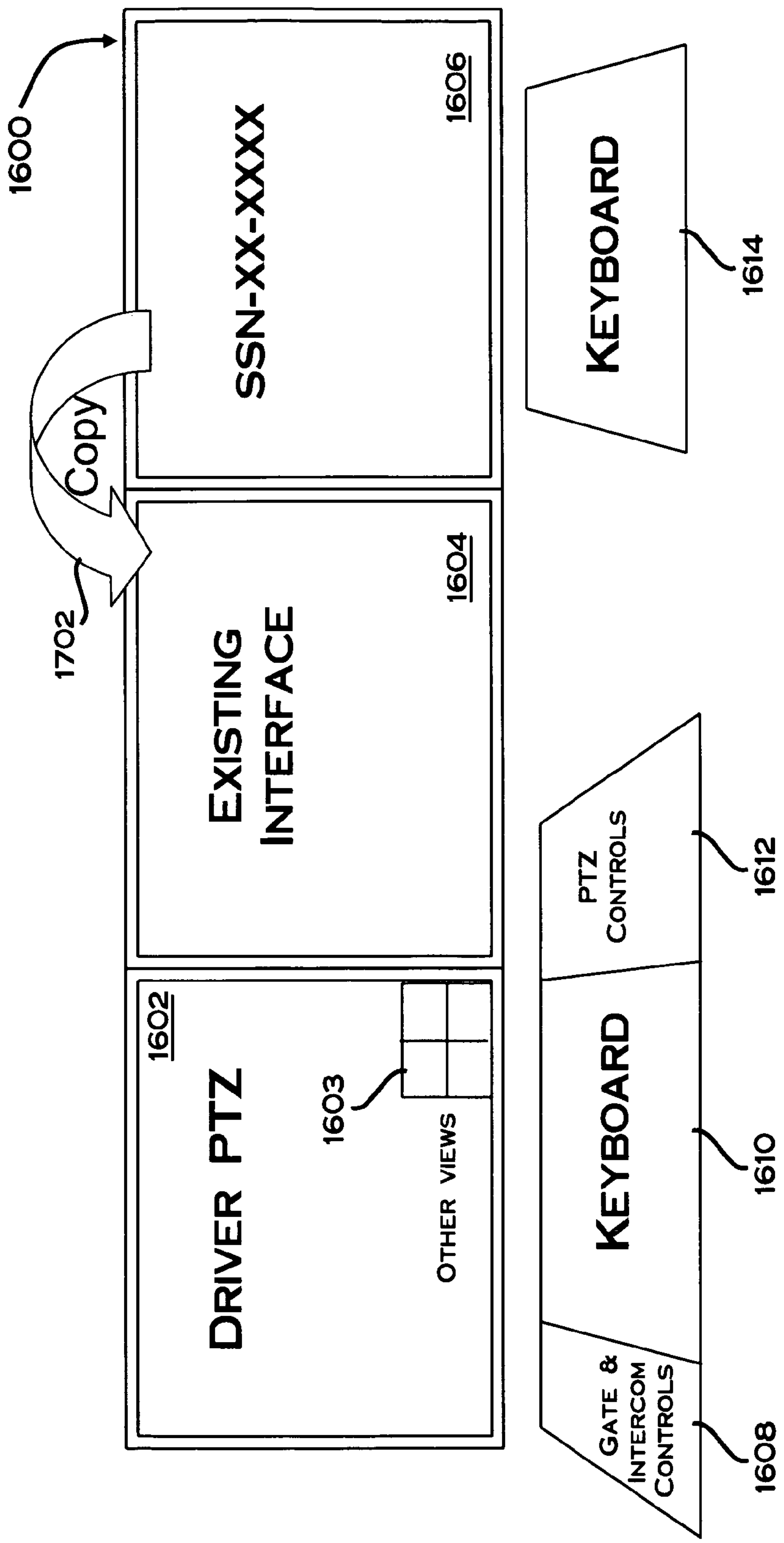
Figure 18:
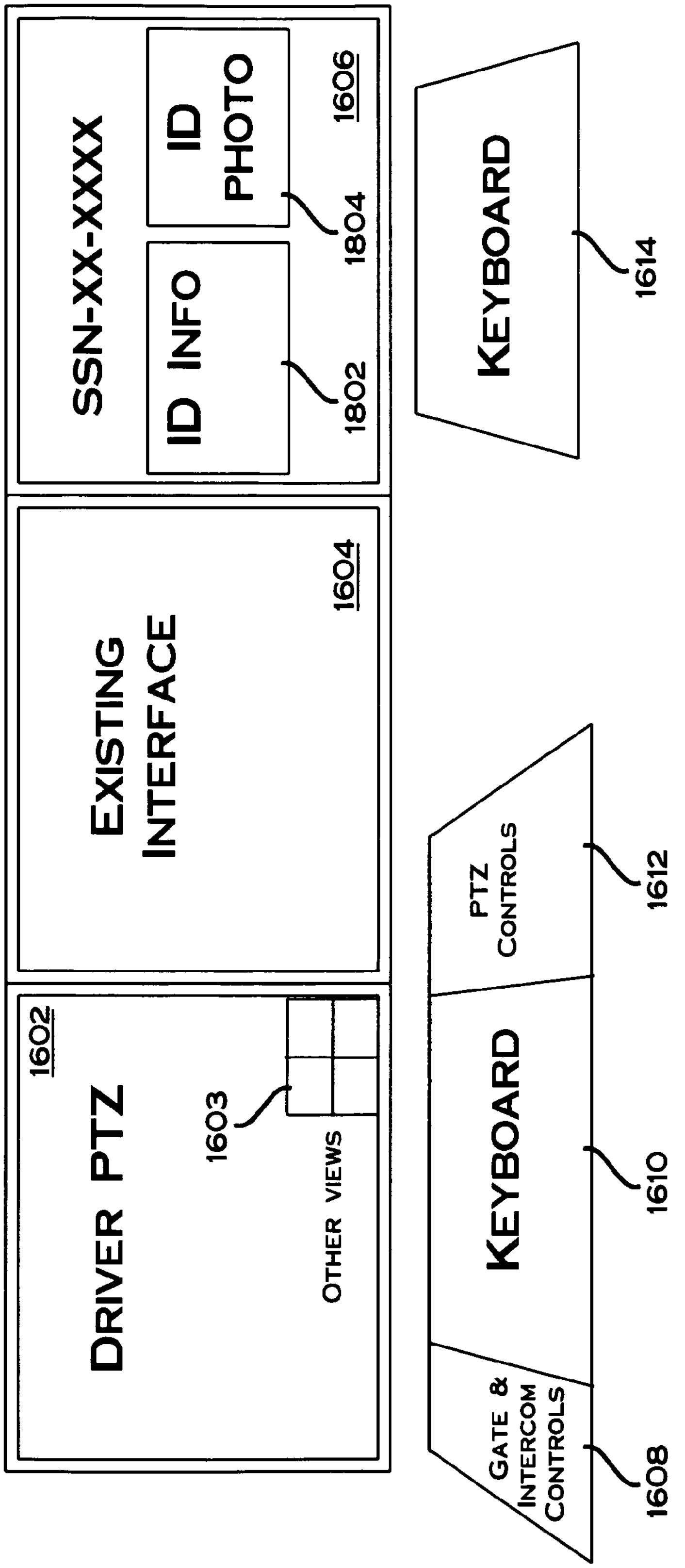
Figure 19:
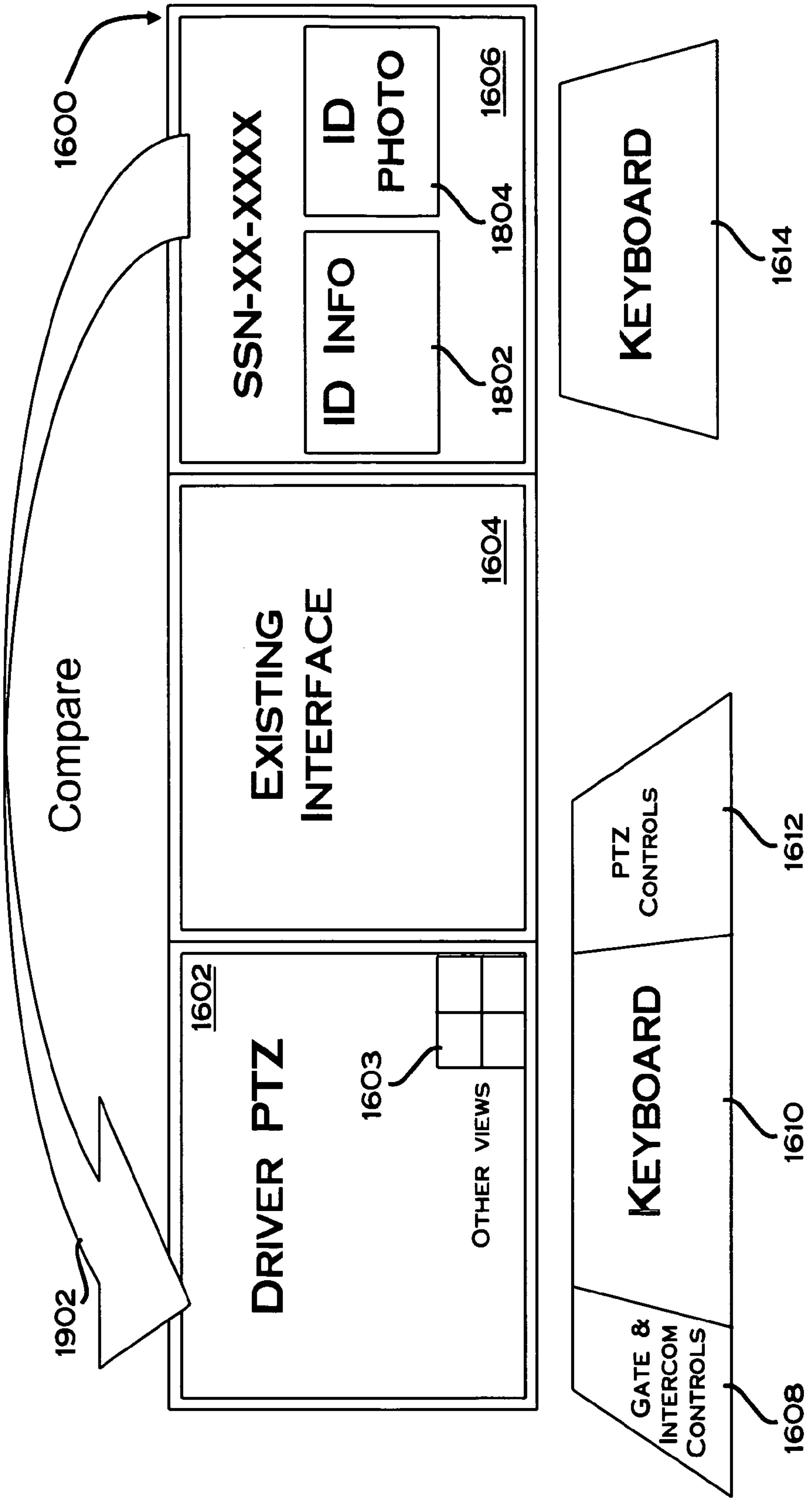
Figure 20:
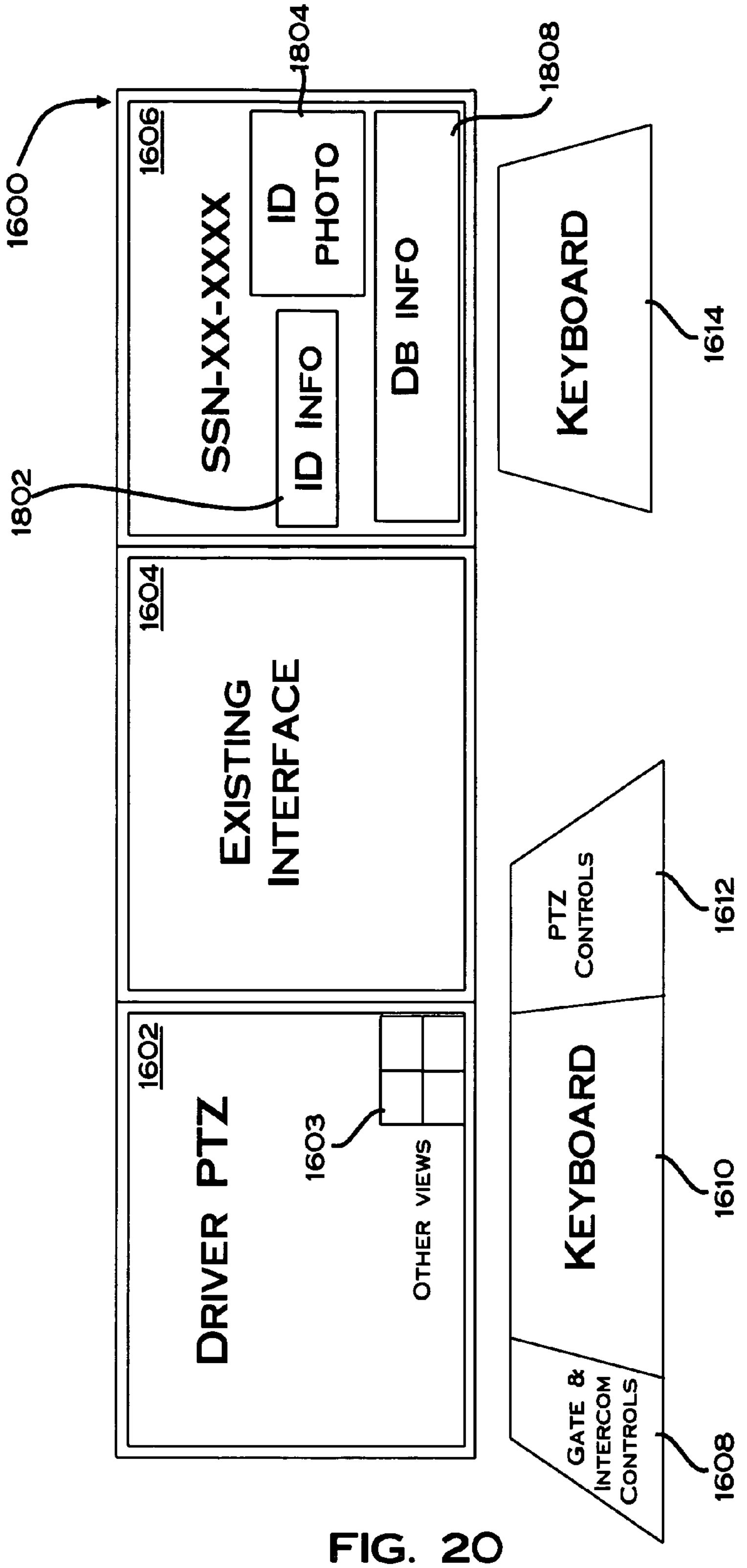
Figure 21:
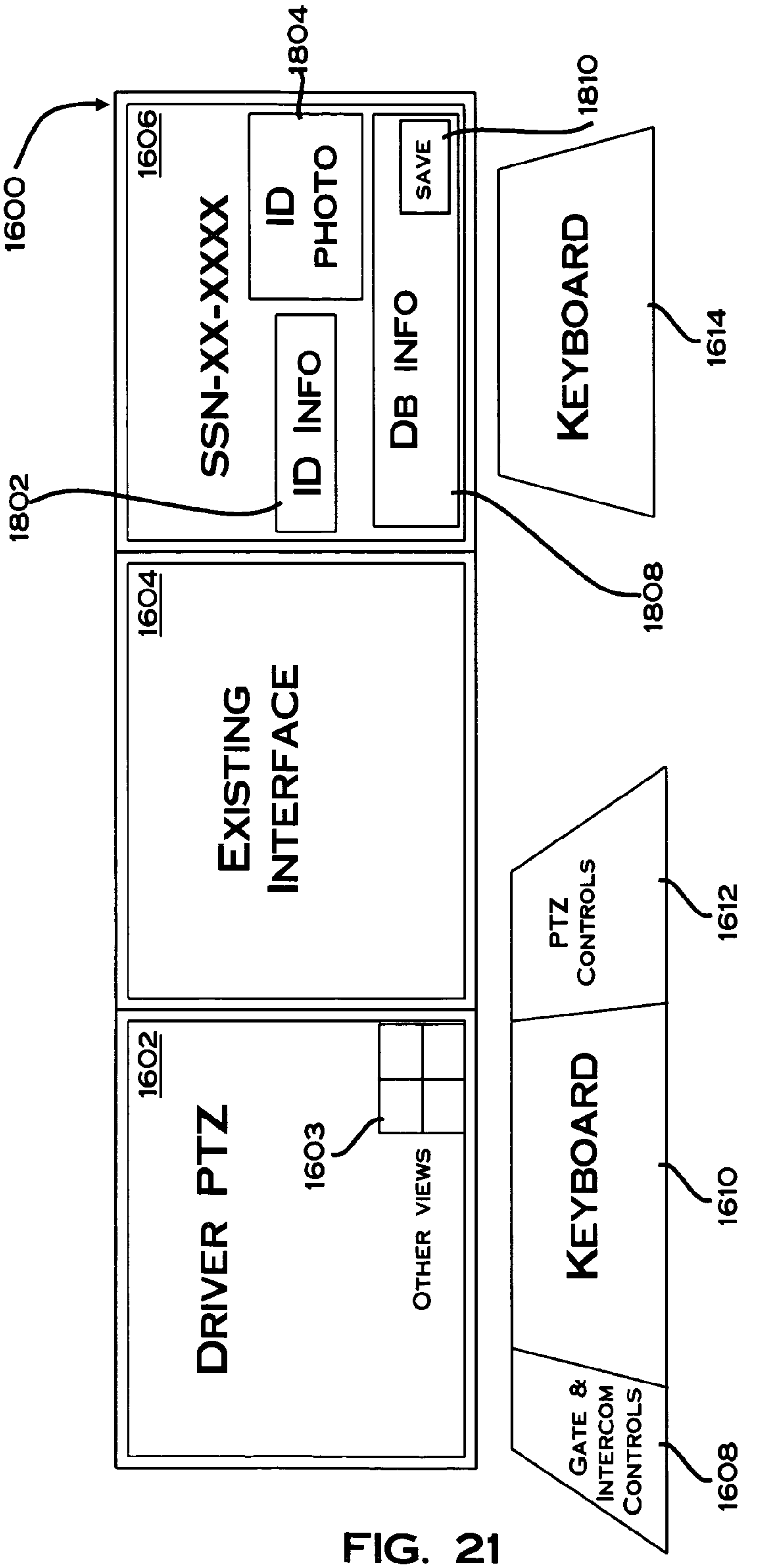
Figure 22:
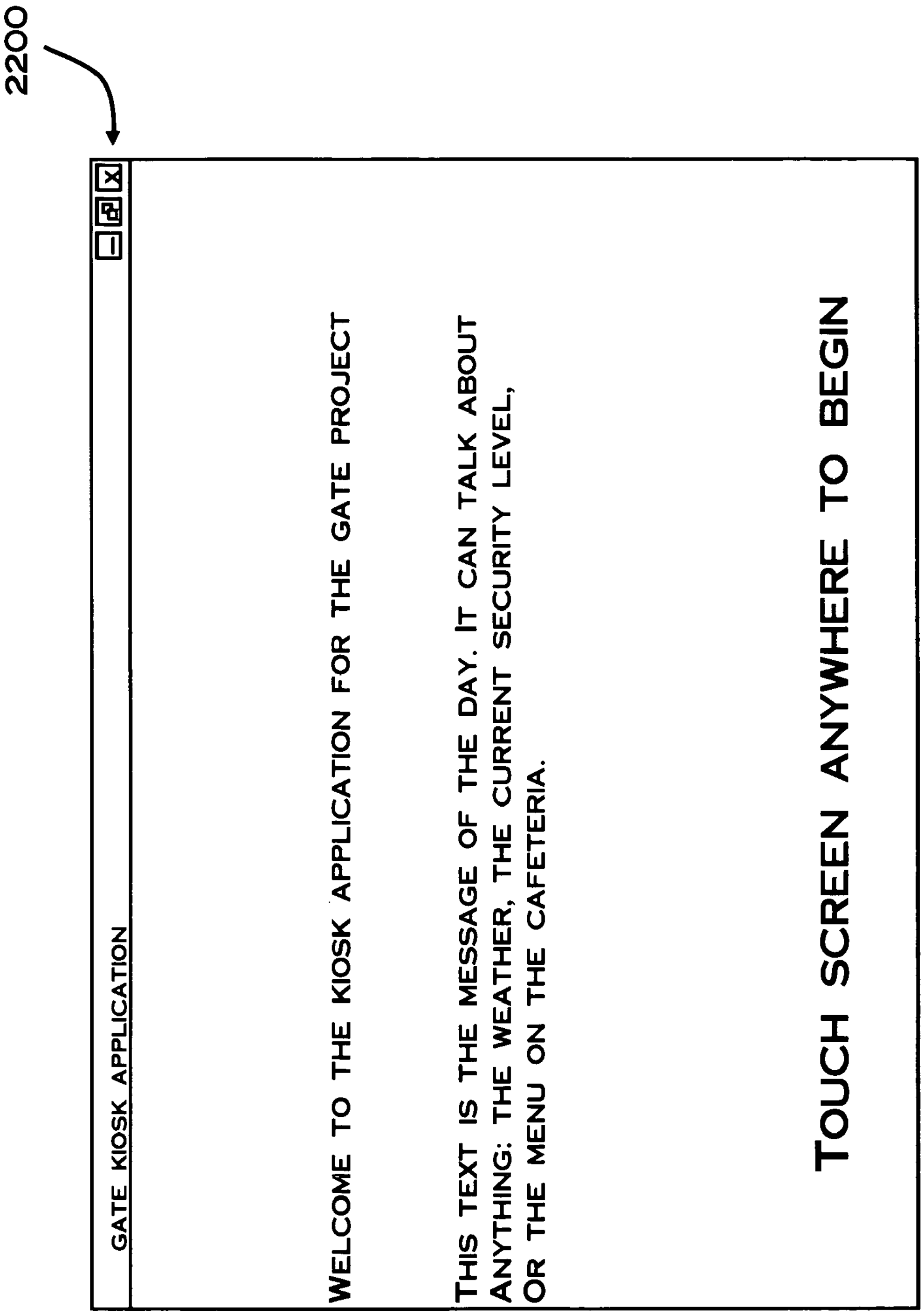
FIGS. 22, 23, 24, and 25 illustrate kiosk interface screens, which can be implemented in accordance with an alternative embodiment.
Figure 23:
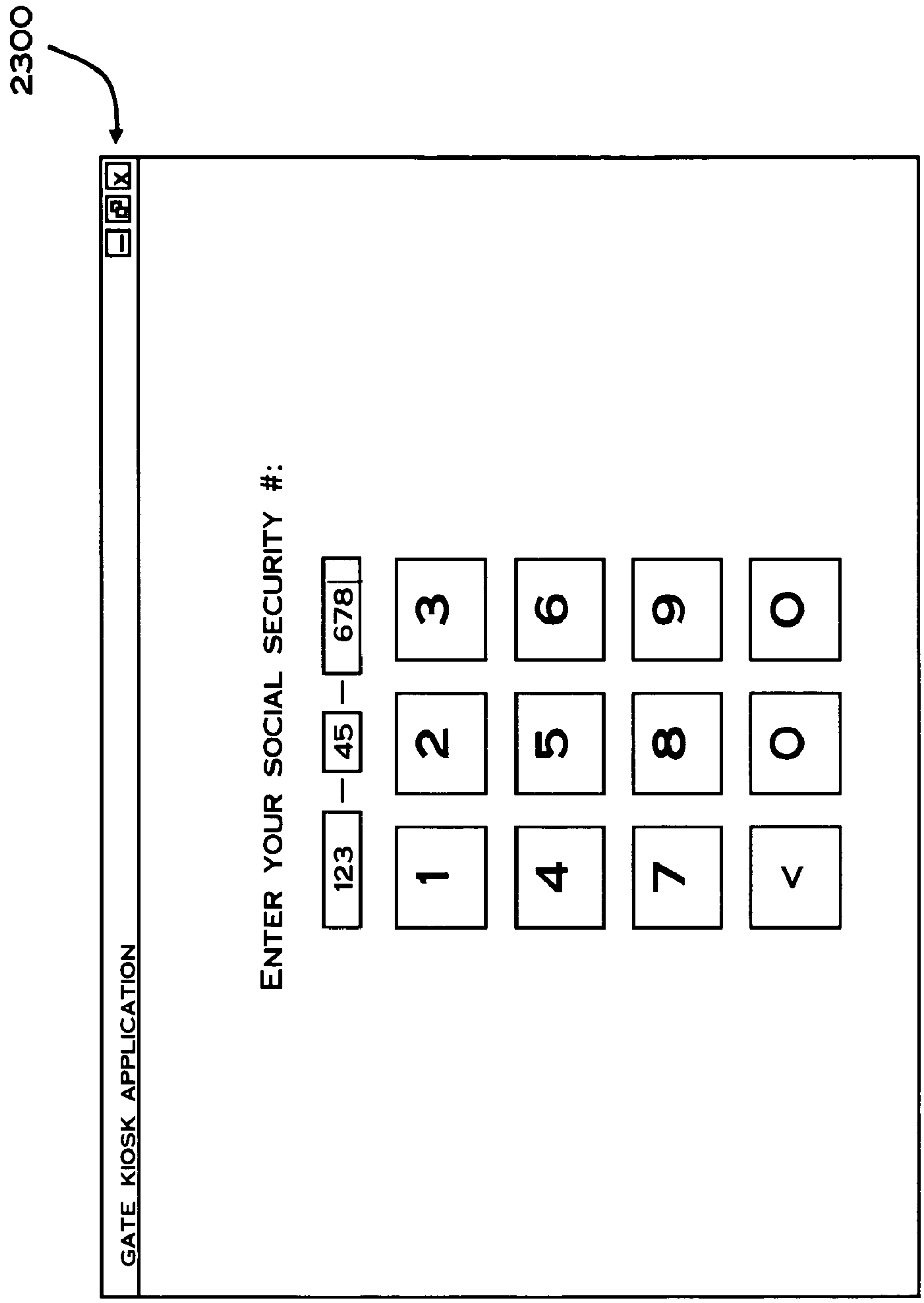
Figure 24:
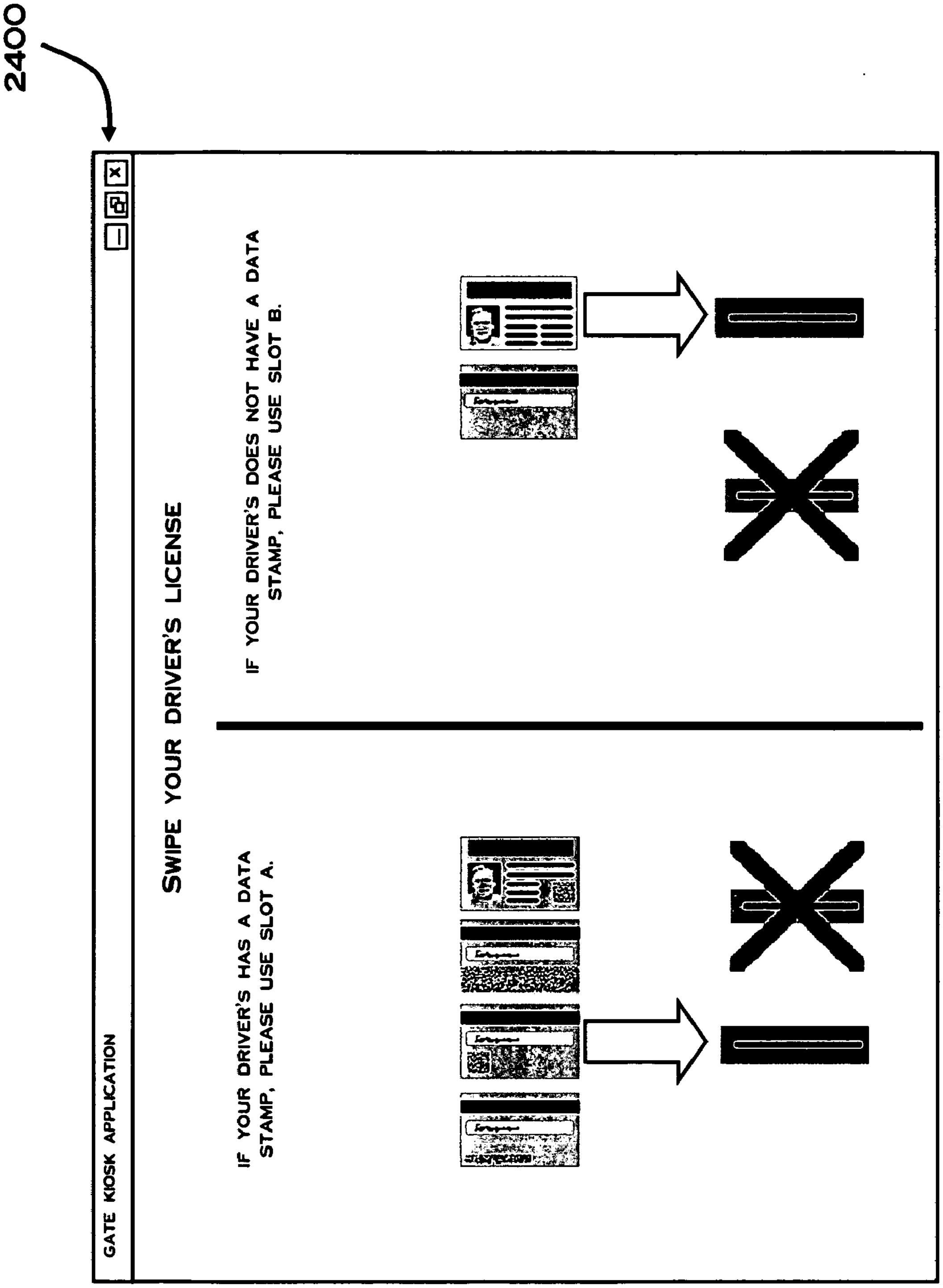
Figure 25:
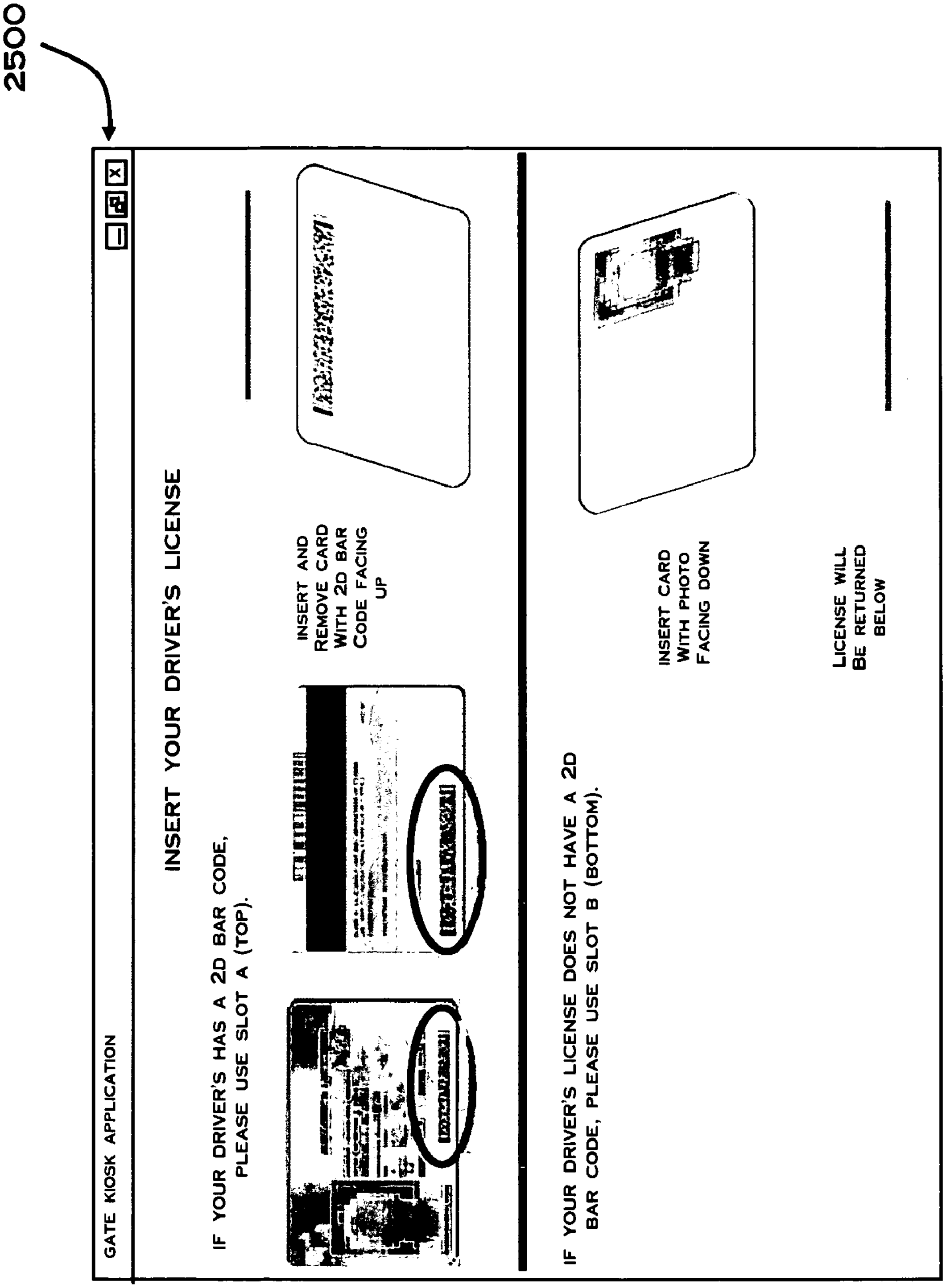

Note that in FIG. 17, an arrow 1702 indicates that data displayed in display screen 1606 can be copied for display via display screen 1604. In the configuration depicted in FIG. 18, an area 1802 is provided within display screen 1606 for display identification information associated with the driver or vehicle occupant, along with an area 1804 for displaying a photo of the driver or vehicle occupant. In the configuration of FIG. 19, an arrow 1902 indicates that photo displayed in area 1804 can be compared to the views of the driver displayed in display screen 1602. This feature enables the screening officer to visually compare the real-time views of the driver displayed in display screen 1602 with that of the driver's license or other identification photo displayed in display area 1804 within display screen 1606. In the configuration depicted in FIG. 20, an additional area 1808 can be provided, which displays database information (e.g., "watch list" or warning information). Display area 1808 is analogous to the display area 216 described earlier. Similarly display area 1606 is analogous to the interfaces 200 and 300 described herein. In the configuration depicted in FIG. 21, a graphical display button 1810 is also indicated, which can be selected by a screening officer to save the information displayed within area 1808. The "save" button 1810 is similar to the graphically displayed "save" button 212 described earlier.

FIGS. 22-25 illustrate kiosk interface screens 2200, 2300, 2400 and 2500, which can be implemented in accordance with an alternative embodiment. Kiosk interface screen 2200 can be implemented as a touch screen user interface device and generally provides general information to the user (i.e., the vehicle driver and/or passenger) seeking security screening in order to pass through a security gate. Kiosk interface screen 2300 can be displayed for the user after the user touches the interface screen 2200. Kiosk interface screen 2300 permits the user to enter his or her social security number for screening verification purposes as explained previously. Kiosk interface 2400 provides information to the user concerning the reading of a driver's license via a card reader associated with the kiosk. The information presented in kiosk interface 2400 instructs the user on which card reader slot (A or B) to use, depending on whether or not the user's driver's license or other identification card contains a data stamp (2D bar code). For example, the information graphically provided to the vehicle driver and/or occupant(s) indicates to the driver that if his or her driver's license has a data stamp, then he or she should insert the card into slot A. Otherwise, if the driver's license does not have a data stamp, the driver or occupant(s) is instructed to use slot B. Similarly, interface screen 2500 provides instructions to the user concerning the use of a driver's license and card reader with respect to a 2D bar code associated with the user's driver's license.

Vehicle Gate Management

Figure 26:
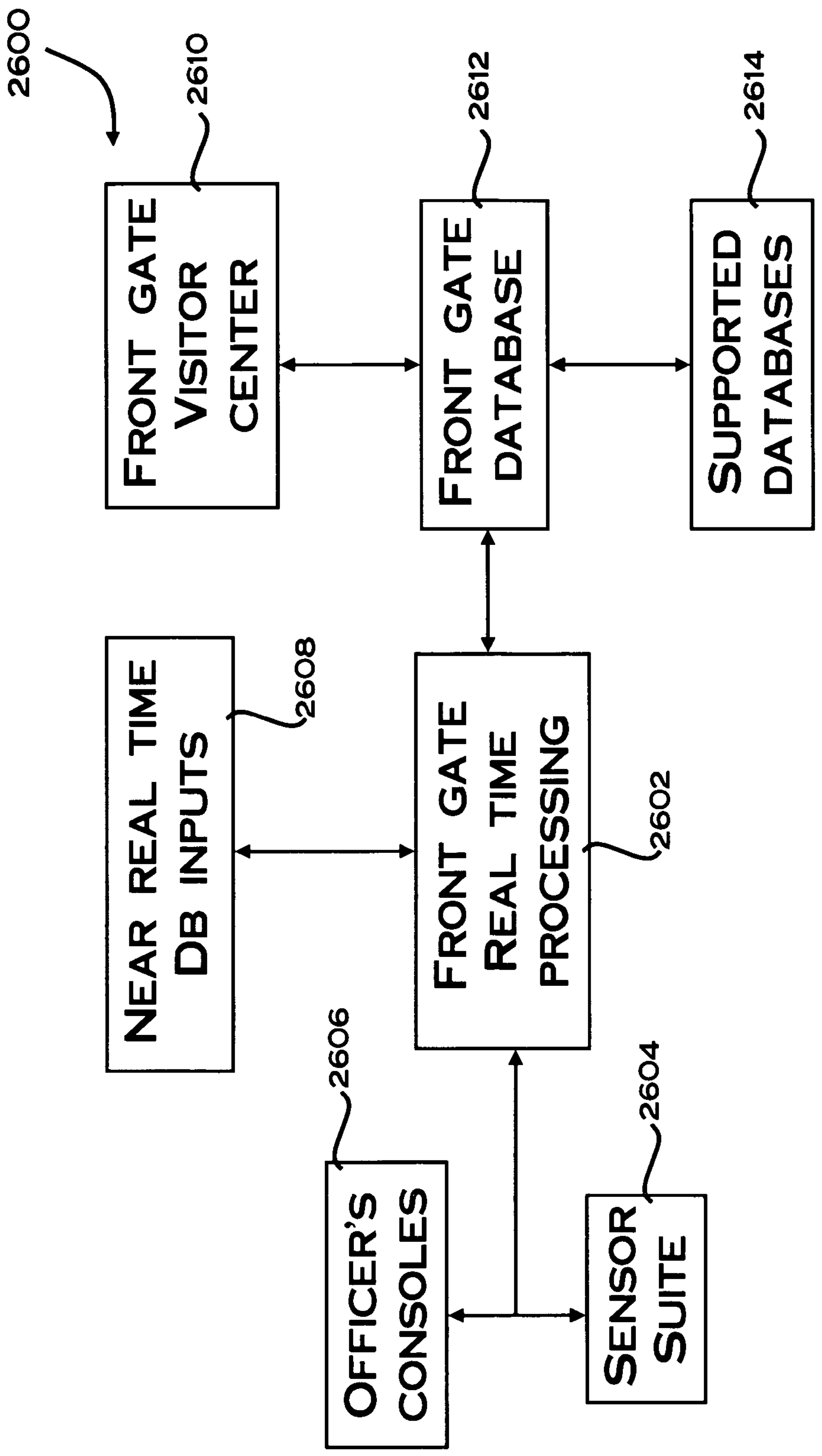
FIG. 26 illustrates a block diagram of a vehicle gate management system that can be implemented in accordance with an alternative embodiment.

FIG. 26 illustrates a block diagram of a vehicle gate management system 2600 that can be implemented in accordance with an alternative embodiment. System 2600 solves the need to manage vehicles entering facility gates to ensure that the occupants have a valid reason to enter such facilities. This may be driven by business reasons (e.g., need to identify vehicles and drivers for billing purposes, verify training, etc.). It may also be driven by security reasons (protect critical infrastructure or a military checkpoint).

System 2600 addresses both security and cost effectiveness by providing a system solution. The architecture of system 2600 allows for a wide ranges of sensors [license plate readers, video cameras with analytics, voice, card (e.g. TWIC or driver's license) readers, biometrics, RFID, etc] to be integrated. The system 2600 provides an extensible database for storing business and security information. It also provides flexible business logic so that the system 2600 can be customized to the process to be applied at a particular site. The systems approach reduces the cost of the system, allowing it to replace guards to reduce operating costs. The multi-sensor support also increases security and can be used to replace or augment guards.

System 2600 thus includes one or more officer consoles 2606, which is analogous to the officer console 1600 described earlier. A sensor suite 2604 of sensors communicates with the officer console(s) 2606. A module 2602 for front gate real-time processing of data and instructions can communicate with both the officer console(s) 2606 and the sensor suite 2604. A front gate database 2612 also communicates with the module 2602 and other supported databases 2614. Note that the module 2602 is analogous to the module 107 described earlier and can be implemented in the context of one or more software modules, depending upon design considerations. A front gate visitor center 2610 also communicates with the front gate database 2612. Additionally, near real-time database inputs 2608 can be provided for front gate-real time processing via module 2602. System 2600 thus addresses the problem of identifying visitors in vehicles approaching the gate of a controlled facility. The event itself can be recorded for later analysis. System 2600 thus constitutes an integrated solution for collecting information on visitors, and performing authorization checks.

The security gate system 2600 can assist officers by collecting information about vehicles and occupants while the vehicle is a safe distance away from the entry of the facility. The information provided by system 2600 will alert the officer when a visitor is suspicious. The standoff data acquisition and rapid information capabilities of system 2600 can also provide the officer with additional time to respond to threats. A secondary function of the system 2600 involves supporting offline data analysis. This allows for other activities such as data mining, linking to other databases and searching for potentially forensic information.

Figure 27:
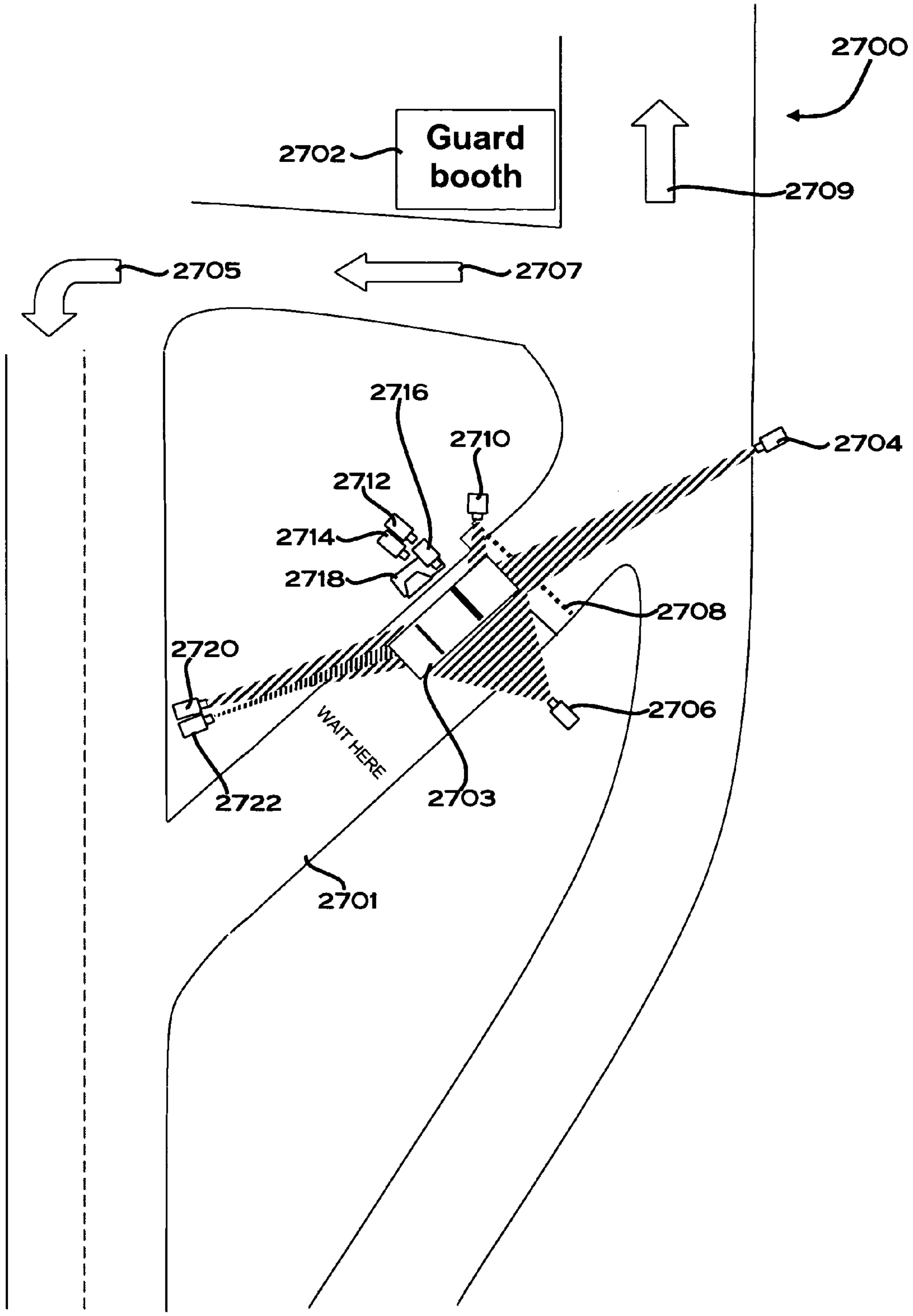
FIG. 27 illustrates a diagram of the physical layout of a typical security gate entry site, which can be implemented in accordance with an alternative embodiment.

FIG. 27 illustrates a diagram of the physical layout of a typical security gate entry site 2700, which can be implemented in accordance with an alternative embodiment. The example site 2700 generally includes a road 2701 over which a vehicle 2703 traverses to enter a security facility. The path for entry into the secured facility is indicated generally by arrow 2709. The vehicle 2703 must first, of course, pass through the gate 2708, which can be electronically and remotely raised or closed from a guard booth 2702, before entering the security facility. A plurality of cameras 2704, 2706, 2710, 2714, 2716, 2720, and 2722 are strategically located within site 2700 to obtain optimal video and still camera views of the vehicle 2703 and any occupants therein.

An electronic drive-up kiosk 2718 is conveniently located adjacent the road 2701 and near the gate 2708 to permit self-screening activities to be initiated. Cameras 2712, 2714 and 2716 are generally associated with the kiosk 2718. Such cameras 2712, 2714, and 2716 can provide optimal views of the occupants of the vehicle 2703. Cameras 2720 and 2722 provide for optimal view of the rear of the vehicle 2703, including the vehicle's license plate. Camera 2706 provides for an optimal view of the side of the vehicle opposite the kiosk 2718. Camera 2704 provides an optimal view of the front of the vehicle 2703, while camera 2712 provides for a specific view of the vehicle driver. The security gate site 2700 is thus implemented in the context of system 2600 described earlier. If, for some reason, after the vehicle 2703 is screened, the security guard decides not to let the vehicle pass into the secured facility along the path indicated by arrow 2709, a return path, indicated by arrows 2705, 2707 directs the vehicle 2703 back onto a main highway or another road and away from the secured facility.

Figure 28:
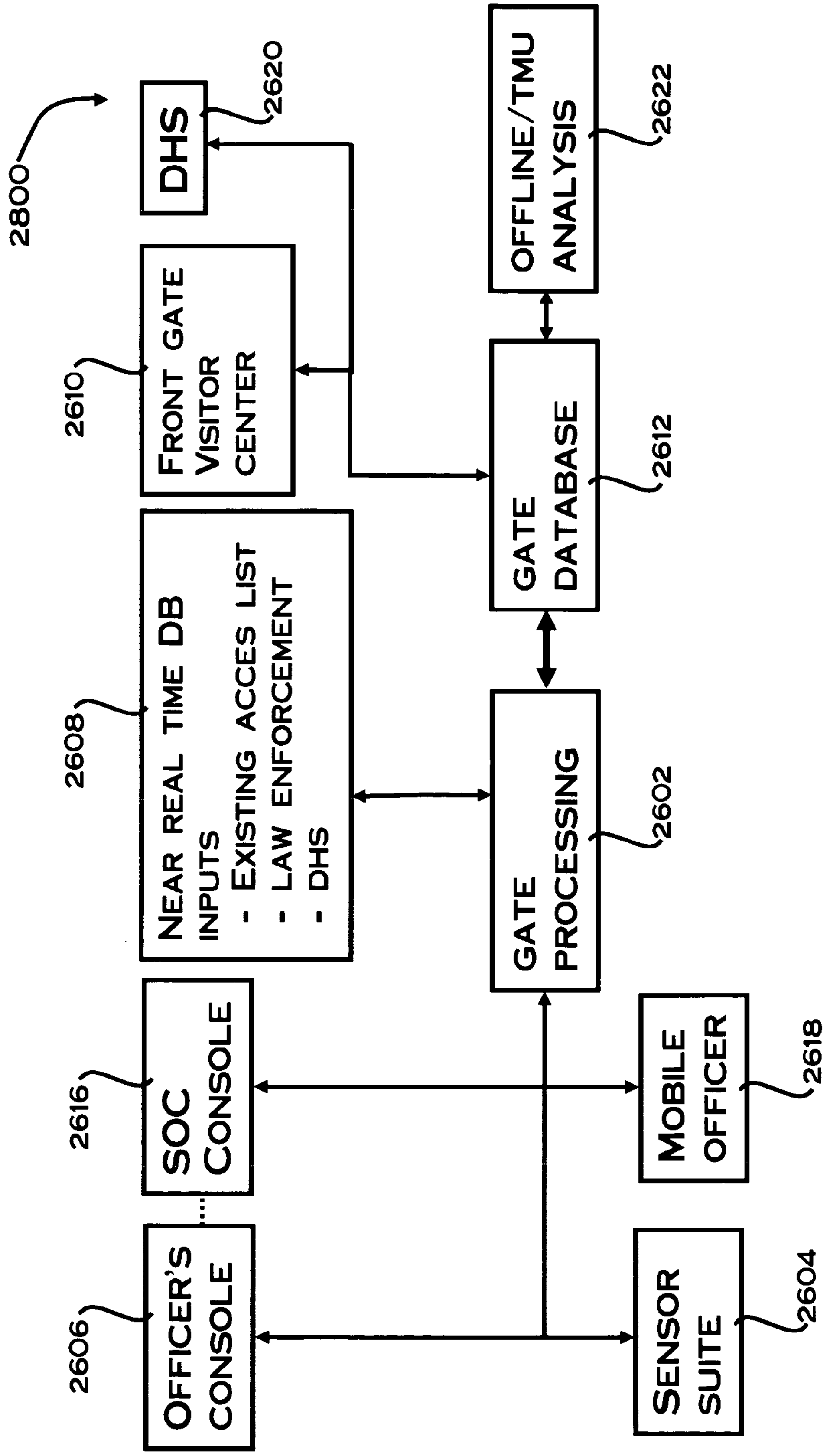
FIG. 28 illustrates a vehicle gate management system that can be implemented in accordance with an alternative embodiment.

FIG. 28 illustrates a vehicle gate management system 2800 that can be implemented in accordance with an alternative embodiment. System 2800 illustrated in FIG. 28 represents an alternative version of the system 2600 depicted in FIG. 26. Note that in FIGS. 26-28, identical or similar parts or elements are generally indicated by identical reference numerals. System 2800 includes the officer console 2606, which provides the human/computer interface for officers. As explained previously, officer console 2606 includes live audio, live video, a database interface and status information. The interface also provides controls for the officer allowing them to control the Pan Tilt Zoom (PTZ) camera, mute their microphone, query the database and enter notes into the database.

System 2800 additionally includes a mobile officer module 2618, which can provide a limited subset of the officer's console 2606 to mobile (in vehicle or on foot) officers. The mobile officer module 2618 is designed to provide information over a wireless link. Module 2618 can be implemented as a module such as module 107 described earlier. System 2800 also includes an SOC (Security Operations Center) console 2616, which can communicate with the officer's console 2606 and the mobile officer 2618. The SOC console 2616 provides near real time support to the officers. The SOC console 2616 can initiate database queries, control cameras and perform similar functions to support officers at the gate and mobile officers. The sensor suite 2604 includes one or more sensors, which are essentially the "eyes" and "ears" of the officer, who is typically located at the guard booth 2702 depicted in FIG. 27. The sensor suite 2604 receives camera control commands from the officer's console. Sensor suite 2604 also collects audio, video, keypad input, driver's license data and license plate number from the vehicle.

The gate processing module 2602 supports real time queries, analysis and matching to support officers at the gate. The gate processing module 2602 can receive inputs from the sensor suite 2604, interface to multiple databases and process real time events. The gate database 2612, which communicates with the gate processing module 2602 constitutes a database that is controlled by the system 2800 and contains data collected by the gate sensors, input by officers and acquired from sources outside of the gate system 2800. This information may be shared with other related systems. System 2800 also includes near real-time database inputs 2608. This feature permits the system 2800 to make queries to systems/databases, which provide support to the gate management system 2800. Examples include visitor control center SSN authorizations, driver's license databases, vehicle registration information, National Crime Information Center (NCIC) and watch lists.

The front gate visitor center 2610 is implemented so that the system 2800 shares information with the visitor center 2610. That is, the visitor center 2610 can receive near real time information from the gate on persons entering the visitor center 2610. The system 2800 also allows the visitor center 2610 to update some elements of the front gate database. 2612 (e.g. flags or notes if this visitor returns. System 2800 can also be configured to include a TMU (Threat Management Unit) 2622. The system 2800 shares information with the TMU and the TMU receives updates from the front gate database 2612. The TMU is also allowed to update some elements of the front gate database. The TMU 2633 may copy the front gate database information into a TMU controlled database so that the TMU may perform analysis and data mining. Finally, system 2800 can communicate with the DHS (Department of Homeland Security) 2620. The DHS 2620 can collect data from multiple gates, facilities and organizations, and can also provide offline analysis and data mining.

Figure 29:
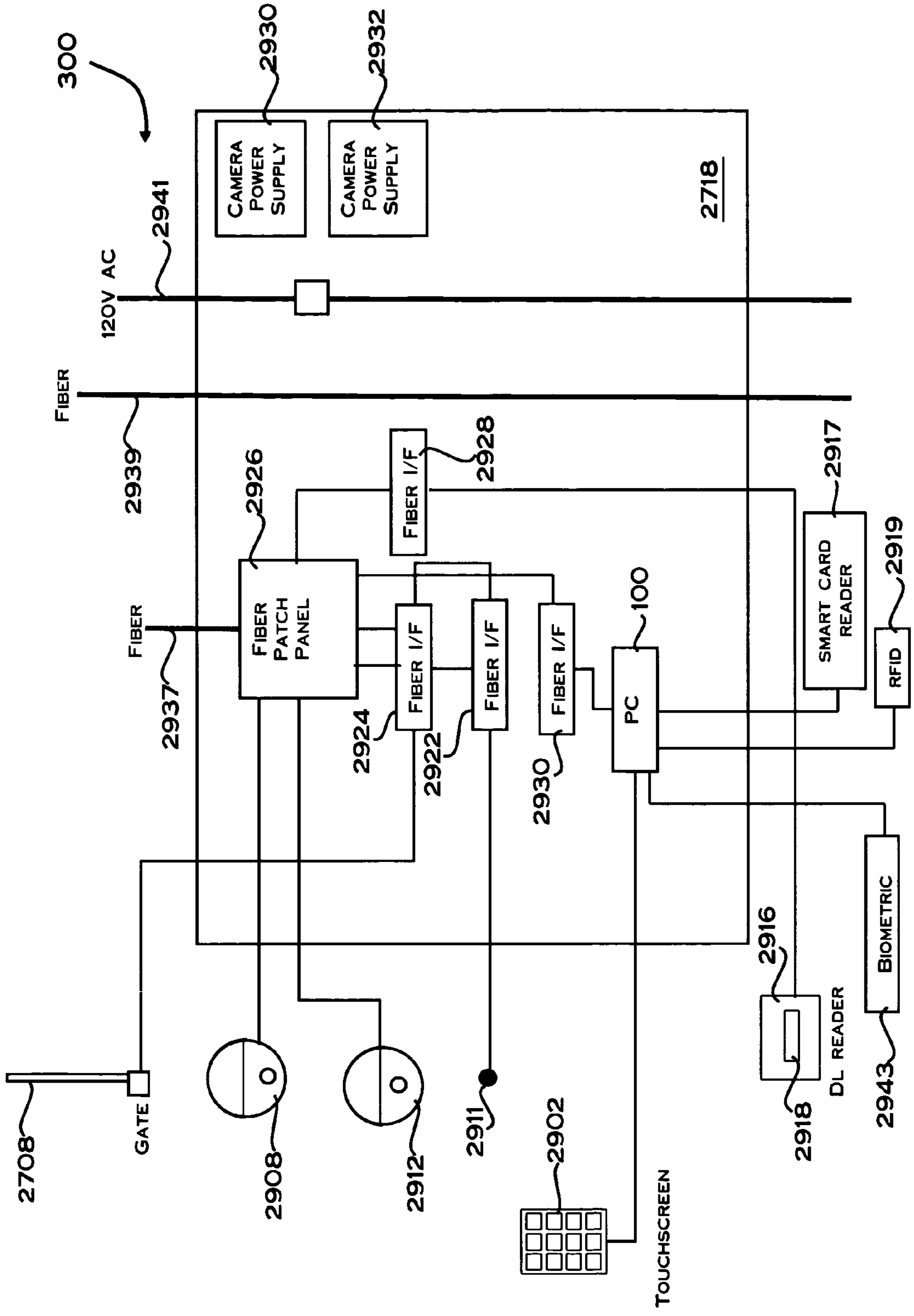
FIG. 29 illustrates a illustrates a kiosk and associated security gate system components, which can be implemented in accordance with an alternative embodiment.

FIG. 29 illustrates a kiosk 2718 and associated security gate system components, which can be implemented in accordance with an alternative embodiment. Note that in FIGS. 1-29, identical or similar parts are generally indicated by identical reference numerals. Kiosk 2718 depicted in FIG. 29 can be implemented as the kiosk 2718 depicted in FIG. 27. In general, kiosk 2718 is associated with the gate 2708 depicted in FIG. 29. Kiosk 2718 includes a microphone 2911 or other audio component that is connected to a Fiber I/F unit 2922 that is connected to a fiber patch panel 2926. The microphone 2911 can be used for speech identification. A vehicle occupant in automobile such as, for example, vehicle 2703 depicted in FIG. 27 can speak into the microphone 2911 to provide his or her voice for speech verification purposes. Kiosk 2718 also includes an officer's camera 2912 that is connected to the fiber patch panel 2926. A face camera 2908 is also provided as a part of kiosk 2718. The face camera 2908 is also generally connected to the fiber patch panel 2926. The face camera 2908 can be implemented in the context of a biometric scanner. For example, face camera 2908 may be utilized to biometrically scan a vehicle occupant's face including iris for biometric facial and/or iris identification. A biometric reader 2943 may actually be connected directly to the data-processing apparatus 100 in order to permit the vehicle occupant to enter particular biometric data, such as, for example, fingerprints, and/or other biometric input data for screening purposes.

A Fiber I/F unit 2930 is connected to the fiber patch panel 2926 and to the data processing apparatus 100 depicted in FIG. 1. The gate 2708 is generally connected to a Fiber I/F unit 2924, which in turn is connected to the fiber patch panel 2926. Note that the data-processing apparatus 100 or another type of computer can be utilized in association with the configuration depicted in FIG. 29. A DL Reader 2916 having a reader slot 2918 is connected to the data-processing apparatus 100, along with a touchscreen 2902. Note that the touchscreen is a display overlay, which possesses the ability to display and receive information on the same screen. The effect of such overlays allows a display to be used as an input device, removing the keyboard and/or the mouse as the primary input device for interacting with the display's content. Such displays can be attached to computers or, as terminals, to networks. Touchscreen 2902 is essentially analogous, for example, to the touchscreen display interface 2200, 2300, 2400, 2500 described earlier with respect to FIGS. 22-25 and the interface 1300, 1400, 1500 described herein with respect to FIGS. 13, 14, 15.

Note that the DL reader 2916 is a barcode reader that can read a two-dimensional bar code associated with a user identification card that belongs to a vehicle occupant. Note that although reader 2916 is depicted in FIG. 29, it can be appreciated that the system and method described herein can also utilizes reader devices that rely on Radio Frequency Identification (RFID) such as, for example, an RFID reader 2919. Near field communications and smartcard technologies which use radio frequency instead of optical means to communicate information can also be employed. For example, a vehicle occupant may possess a card having an RFID tag that can be automatically scanned by a wireless RFID reader 2919 associated with the kiosk 2718 in order to assist in verifying the identity of the vehicle occupant. Similarly, the identification card belong to the vehicle occupant can be, for example, a smart card and a smart card reader 2917 may be employed by kiosk 2718 instead of and/or in addition to reader 2916. The DL reader 2918, the biometric reader 2943, the RFID reader 2919 and the smart card reader 2917 constitute a few examples of reader devices for extracting particular identification data associated with the vehicle occupant.

Kiosk 2718 additionally includes two lines 4299 and 2941 which can electrically or optically connect to the processing and display elements of the system. A fiber line 2937 is generally connected to the fiber patch panel 2926. Kiosk 2718 also includes one or more camera power supplies 2930 and 2932.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle screening system for screening vehicles and occupants for entrance to a secured facility:

a processor;

an interface that communicates with said processor, wherein said interface displays identification information extracted from a vehicle occupant associated with a vehicle for processing by said processor;

a drive-up electronic kiosk associated with said interface and said processor, wherein said drive-up electronic kiosk facilitates the handling and management of said identification information extracted from said vehicle occupant in order to permit or deny said vehicle occupant and said vehicle entry to a secured facility through a security gate and thereby confirm the identity of said vehicle occupant at a safe distance from said vehicle to reduce a risk of exposure to said vehicle;

a car list screen for displaying information within said interface regarding a plurality of vehicles in line with respect to security gate, wherein said car list screen permits a selection of a vehicle designated for secondary screening by a secondary screener from among said plurality of vehicles wherein said secondary screener selects a vehicle from a prioritized list of vehicles, acquires identity information from an occupant of said vehicle, and searches a vehicle watch list for greater information granularity with respect to said identification information gathered from said selected vehicle and said vehicle occupant; and a car information screen that displays said identification information within said interface concerning said selected vehicle and which permits said secondary screener to add and modify information concerning said selected vehicle.

2. The system of claim 1 further comprising a plurality of cameras associated with said interface and in communication with said processor and said plurality of controls, wherein said plurality of cameras obtain at least one video view of said vehicle occupant and said vehicle for display in a particular display area of said interface.

3. The system of claim 1 further comprising a reader device for extracting particular identification data from said vehicle occupant.

4. The system of claim 1 wherein said interface further displays information about said vehicle occupant electronically extracted from a database in response to a query to said database initiated through said interface.

5. The system of claim 4 wherein said information about said vehicle occupant extracted from said database further includes any available adverse information concerning said vehicle occupant.

6. A user interface apparatus for use in a drive-up electronic kiosk in a vehicle screening system, said user interface apparatus comprising:

a processor;

a drive-up electronic kiosk that communicates with said processor;

an interface associated with said processor and said drive-up electronic kiosk, wherein said interface instructs and permits a vehicle occupant to rapidly input identification data to said drive-up electronic kiosk and thereafter verifies or denies said vehicle occupant entry to a secured facility through a security gate while confirming the identity of said vehicle occupant at a safe distance from said vehicle in order to reduce a risk to security personnel of exposure to said vehicle;

a car list screen for displaying information within said interface regarding a plurality of vehicles in line with respect to security gate, wherein said car list screen permits a selection of a vehicle designated for secondary screening by a secondary screener from among said plurality of vehicles wherein said secondary screener selects a vehicle from a prioritized list of vehicles, acquires identity information from an occupant of said vehicle, and searches a vehicle watch list for greater information granularity with respect to said identification information gathered from said selected vehicle and said vehicle occupant; and a car information screen that displays said identification information within said interface concerning said selected vehicle and which permits said secondary screener to add and modify said identification information concerning said selected vehicle.

7. The apparatus of claim 6 further comprising a biometric reader associated with said drive-up electronic kiosk that permits said vehicle occupant to input said data associated with said vehicle occupant as biometric information associated with said vehicle occupant.

8. The apparatus of claim 6 wherein said interface comprises a touchscreen display for permitting said vehicle occupant to input said identification data associated with said vehicle occupant.

9. The apparatus of claim 8 wherein said touchscreen display comprises a data-entry screen that permits said identification data in the form of a particular identification number to be entered on said touchscreen using a calculator-like graphically displayed keypad including at least one graphically displayed key for permitting said vehicle occupant to correct mistakes and transmit said identification number for processing by said processor.

10. The apparatus of claim 6 wherein said interface comprises a reader device for extracting said identification data from an identification card provided by said vehicle occupant.

11. The apparatus of claim 6 wherein said interface displays an instruction screen for instructing said vehicle occupant on how to input said identification data to said drive-up electronic kiosk.

12. The apparatus of claim 6 further comprising a communications unit associated with said interface, wherein said communications unit permits said vehicle occupant to communicate directly via an audio or video link with a security officer during screening initiated through said interface.

13. A security gate management system, comprising:

a plurality of sensors for detecting an identity of a vehicle or a vehicle occupant with respect to a security gate for entry to a secured facility, wherein said plurality of sensors are located proximate to said security gate for optimal screening and identification of said vehicle occupant or said vehicle;

a database for storing and retrieving identification information of said vehicle occupant or said vehicle;

an interface console for permitting a security guard to electronically and remotely monitor said vehicle or said vehicle occupant utilizing data retrieved from said plurality of sensors and identification information retrieved from said database, which permits said security guard to thereby confirm the identity of said vehicle occupant at a safe distance from said vehicle in order to reduce a risk of exposure to said vehicle, while rapidly and efficiently allowing said security guard to verify or deny said vehicle occupant or said vehicle entry to said secured facility through said security gate;

a car list screen for displaying information within said interface regarding a plurality of vehicles in line with respect to security gate, wherein said car list screen permits a selection of a vehicle designated for secondary screening by a secondary screener from among said plurality of vehicles wherein said secondary, screener selects a vehicle from a prioritized list of vehicles, acquires identity information from an occupant of said vehicle and searches a vehicle watch list for greater information granularity with respect to said identification information gathered from said selected vehicle and said vehicle occupant; and a car information screen that displays information within said interface console concerning said selected vehicle and which permits said secondary screener to add and modify information concerning said selected vehicle.

14. The system of claim 13 wherein said plurality of sensors comprises at least one sensor for identifying a license plate associated with said vehicle.

15. The system of claim 13 wherein said plurality of sensors comprises at least one video camera for obtaining a video view of said vehicle occupant or said vehicle.

16. The system of claim 13 wherein said plurality of sensors comprises a biometric reader for receiving biometric data from said vehicle occupant.

17. The system of claim 13 wherein said plurality of sensors comprises a card reader for scanning a barcode associated with an identification card provided by said vehicle occupant.

18. The system of claim 13 wherein said plurality of sensors comprises an RFID reader for reading an RFID tag associated with said vehicle occupant.

19. The system of claim 13 wherein said database comprises an extensible database.

20. The system of claim 1 further comprising a plurality of sensors associated with said drive-up electronic kiosk that permits said vehicle occupant to input said data associated with said vehicle occupant as identification information associated with said vehicle occupant, wherein said plurality of sensors includes at least one of the following: a biometric reader for receiving biometric data from said vehicle occupant, a video camera for identifying a license plate associated with said vehicle, a card reader for scanning a barcode associated with an identification card provided by said vehicle occupant, and an RFID reader for reading an RFID tag associated with said vehicle occupant.

* * * * *